(12) United States Patent
Scott

(10) Patent No.: US 11,512,959 B2
(45) Date of Patent: Nov. 29, 2022

(54) PORTABLE FLIGHT NAVIGATION TOOL ADAPTED TO ASSIST PILOTS IN COMPLIANCE WITH INTERNATIONAL FLIGHT PROCEDURES AND NAVIGATION

(71) Applicant: Scott International Procedures, LLC, Livermore, CO (US)

(72) Inventor: Shawn Scott, Livermore, CO (US)

(73) Assignee: Scott International Procedures, LLC, Livermore, CO (US)

( * ) Notice: Subject to any disclaimer, the term of this patent is extended or adjusted under 35 U.S.C. 154(b) by 516 days.

(21) Appl. No.: 16/653,748

(22) Filed: Oct. 15, 2019

(65) Prior Publication Data

US 2020/0116492 A1 Apr. 16, 2020

Related U.S. Application Data

(60) Provisional application No. 62/745,879, filed on Oct. 15, 2018.

(51) Int. Cl.
*G01C 21/20* (2006.01)
*B64D 45/00* (2006.01)
*G06F 16/29* (2019.01)

(52) U.S. Cl.
CPC ............. *G01C 21/20* (2013.01); *B64D 45/00* (2013.01); *G06F 16/29* (2019.01)

(58) Field of Classification Search
CPC ........ G01C 21/20; G01C 23/00; B64D 45/00; B64D 2045/0075; G06F 16/29
See application file for complete search history.

(56) References Cited

U.S. PATENT DOCUMENTS

| 9,939,271 | B1* | 4/2018 | Foster | ................ G06F 3/04845 |
| 2017/0140654 | A1* | 5/2017 | Dennerline | ............ G01C 21/20 |
| 2020/0047913 | A1* | 2/2020 | Shavit | ................ G06Q 10/0631 |

* cited by examiner

*Primary Examiner* — James J Lee
*Assistant Examiner* — Shon G Foley
(74) *Attorney, Agent, or Firm* — Lathrop GPM LLP

(57) ABSTRACT

A portable flight navigation tool has a tablet computer with GPS, and memory with an aviation database with international operating rules including transoceanic flight rules, a moving-map database with tracks, coastal airport identifiers and locations, and predefined reporting point locations for transoceanic operations. The navigation tool includes machine readable code for displaying the operating rules, reading locations from the GPS while indicating them on a moving map display, and a trip database with a planned transoceanic route for an individual flight configured by entry of waypoints or names and selection of predefined tracks. The tool has a checklist database and displays checklists for pre-departure, coast-out flight phase, waypoint-reached, and a coast-in flight phases; and may provide a heading and next-waypoint timing for rhumb-line routes from GPS failure locations to the next waypoint of the active route. The tool links as a master/secondary pair with another like tool.

16 Claims, 44 Drawing Sheets

Enroute After Passing Each Oceanic Waypoint

| Enroute After Passing Each Oceanic Wpt | | |
|---|---|---|
| Confirm CPDLC (CDA) Loggin In | | ✓ |
| Waypoint, Track, Dis | Verify | ✓ |
| HF/VHF Check Set | | ✓ |
| Transponder Set | NAT 2000, 20min after entry | ✓ |
| Fuel | Monitor and record on Flt Plan | ✓ |
| Time | Moniter and update ETA... | ✓ |
| Position Report | CPDLC and or VOICE... | ✓ |
| SLOP | Consider best option | ✓ |
| 10 Minute Check | Plot FMS Position | ✓ |
| ETPs | Monitor | ✓ |
| Midway Along Route | Caputer Wind Drift Corr held | ✓ |
| Approaching Next Waypoint | Repeat Above | ✓ |

Figure 1 Oceanic Flight Reminders
Set Oceanic Flight Reminders
Check that your preferences for Oceanic Flight Reminders are up to date
Enable/Disable All
Prior to Coast Out
Prior to passing Waypoint
After passing Waypoint
Ten-Minute Check
Approaching new FIR
Capture Wind Drift Correction
Save Preferences    Finish
Figure 2 - Disabled (Grey)

Figure 1A – System Block Diagram
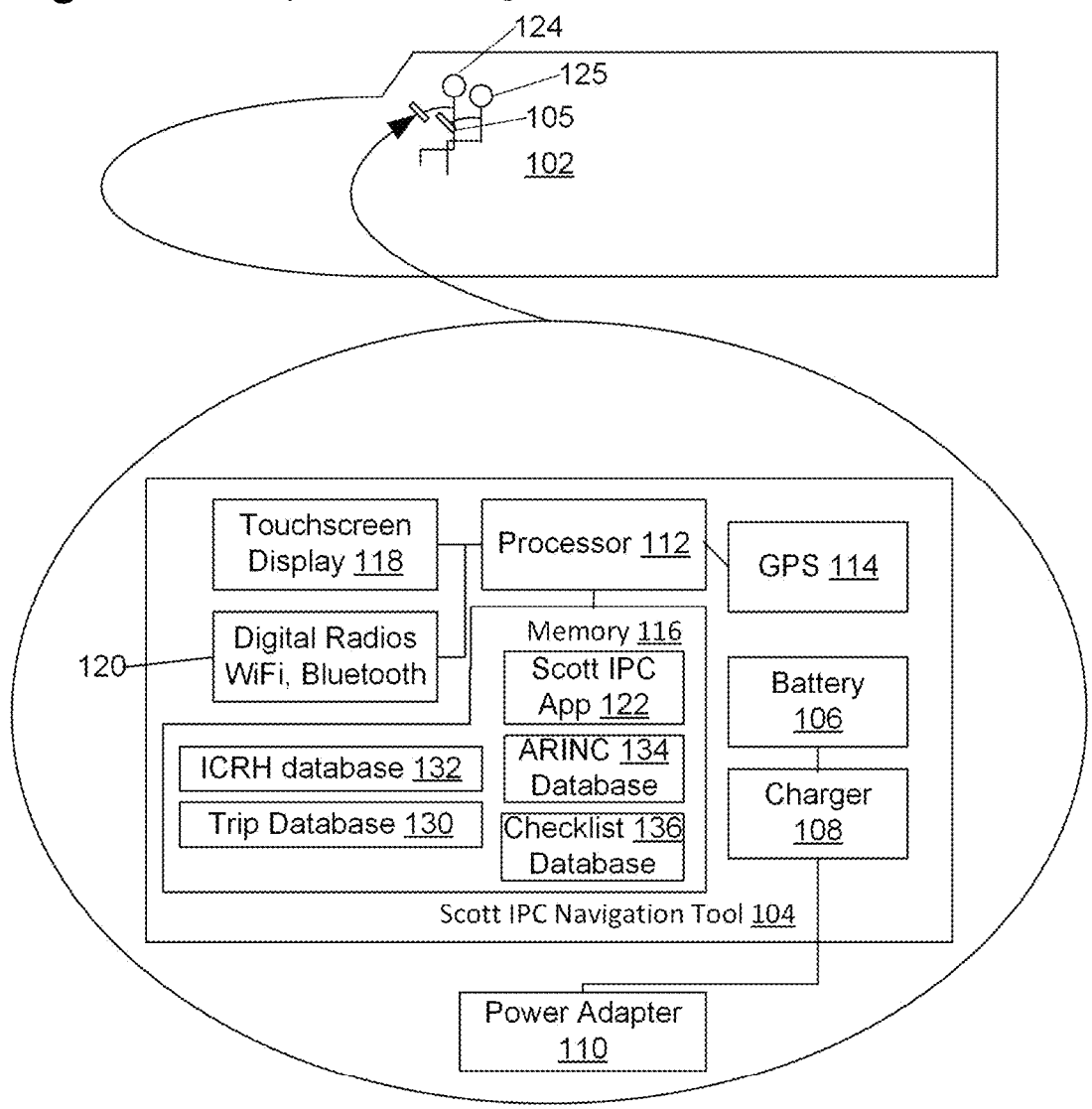
Figure 3 - Active GPS icon
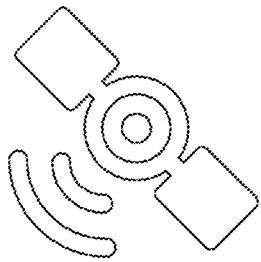

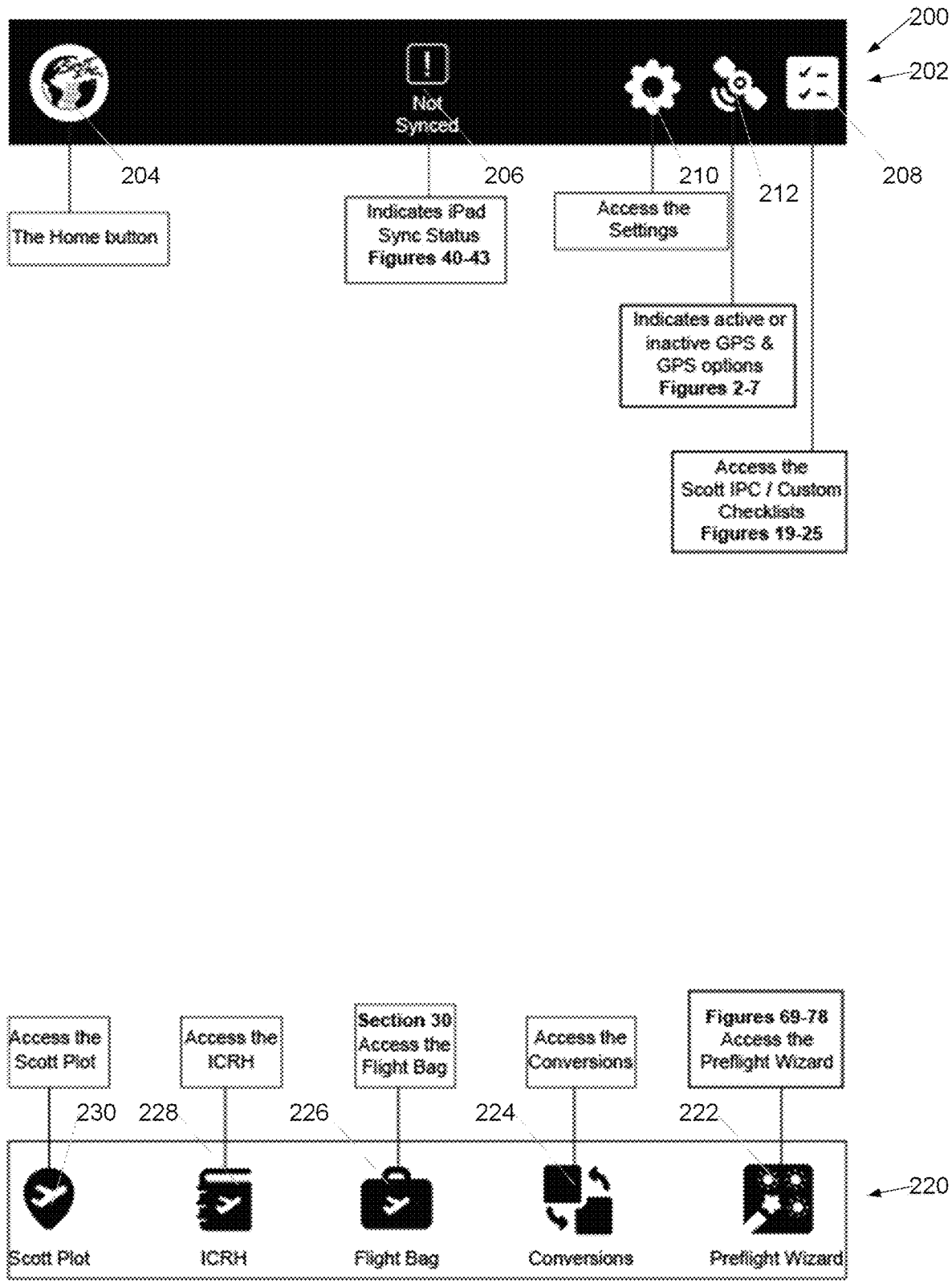

Figure 4 - GPS unusable icon
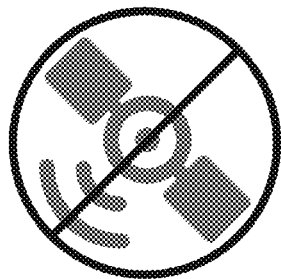
Figure 5 - GPS Mode Selection Menu
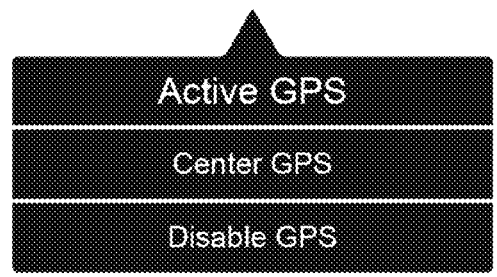
Figure 6 - GPS Mode Selection Menu

Figure 7 - GPS FAIL and ACTIVE Stamps
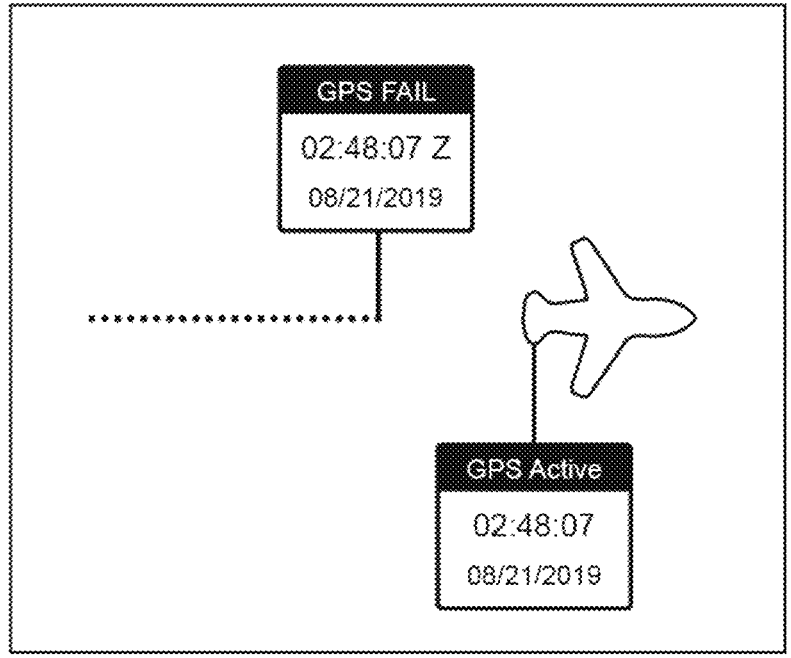
Figure 8 - Auto Plot Oceanic Route build entry form

Figure 9- Confirm Delete Waypoint
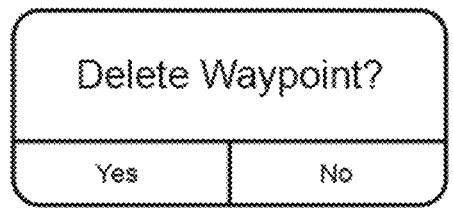
Figure 10- Modify Routes Drag and Drop
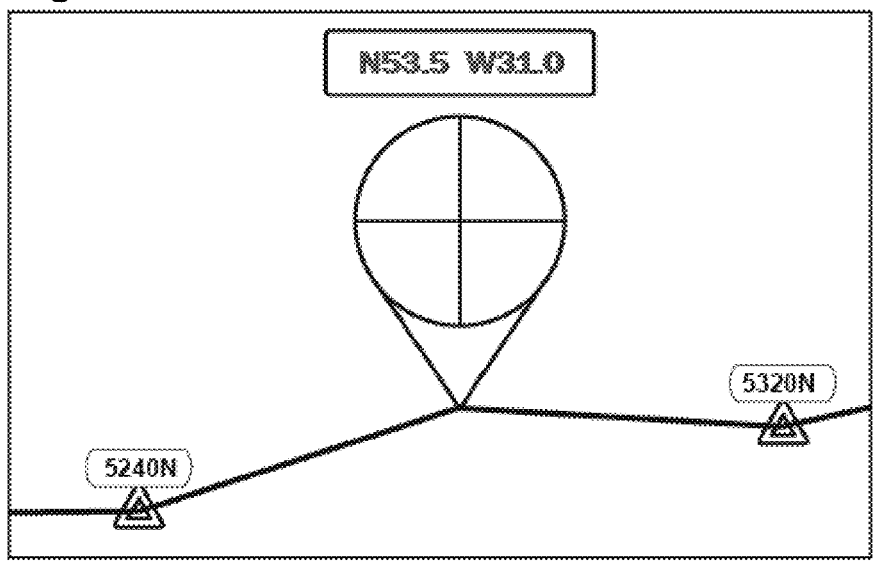
Figure 11- Popup allows users to set "snap to" for drag and drop.
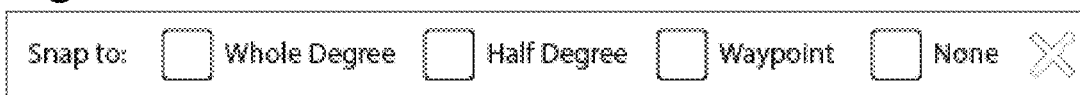

Figure 12 - Navigation System Position Check Form for aircraft Navigation System Sensor position entry.

| NAV AID | 3 Letter Ident | | | |
|---|---|---|---|---|
| RAW R/DME | RADIAL | | DME NM | |
| FMS R/DME | RADIAL | | DME NM | |
| FMS 1 | | | | |
| FMS 2 | | | | |
| FMS 3 | _00° 00.0 | | _000° 00.0 | |
| IRS 1 | | | | |
| IRS 2 | | | | |
| IRS 3 | | | | |
| GPS | _00° 00.0 | | _000° 00.0 | |

VIEW ON CHART

Figure 13 - RAW R/DME A/C sensor position
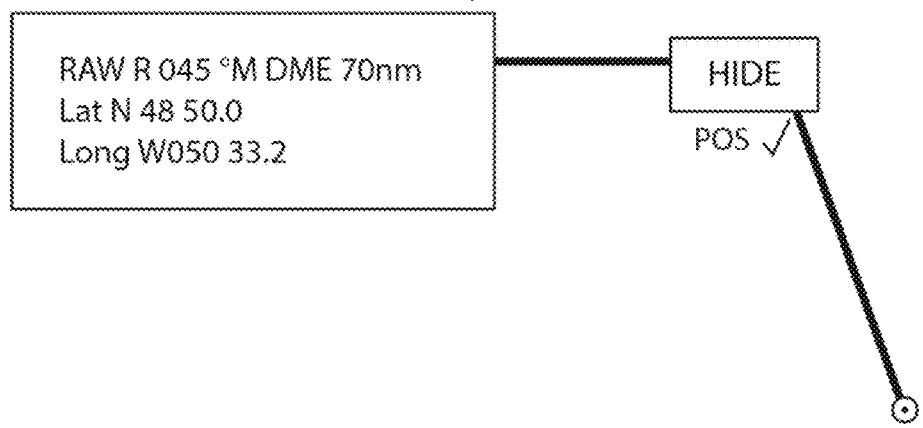
Figure 14 - FMS R/DME exact position shown
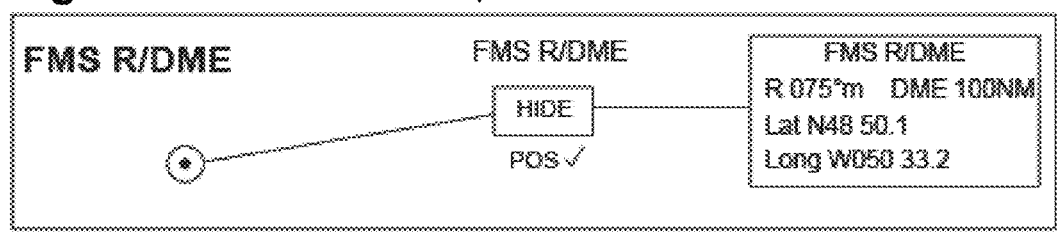
Figure 15 - FMS1, FMS2, FMS3
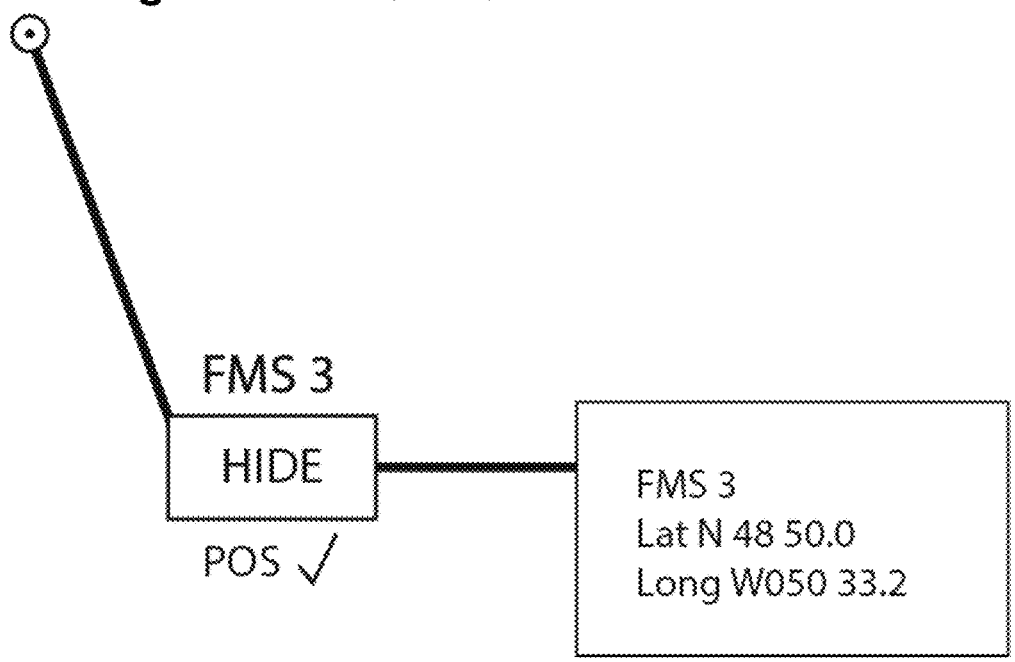

Figure 16 - IRS1, IRS2, IRS3
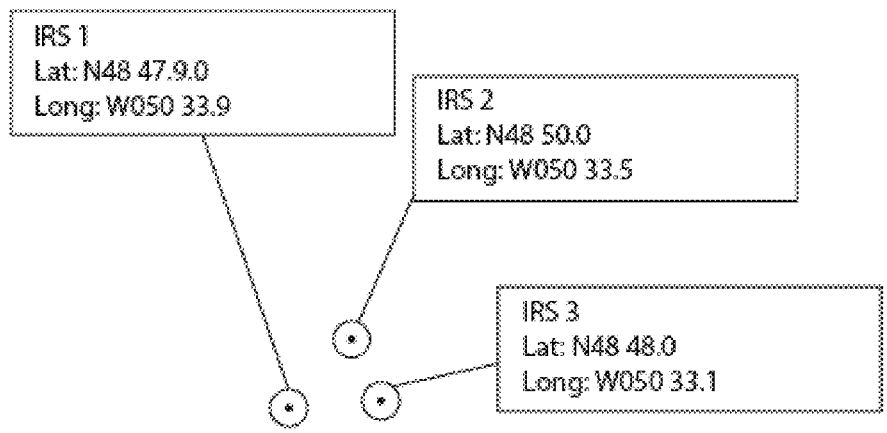
Figure 17 - GPS- exact positions shown
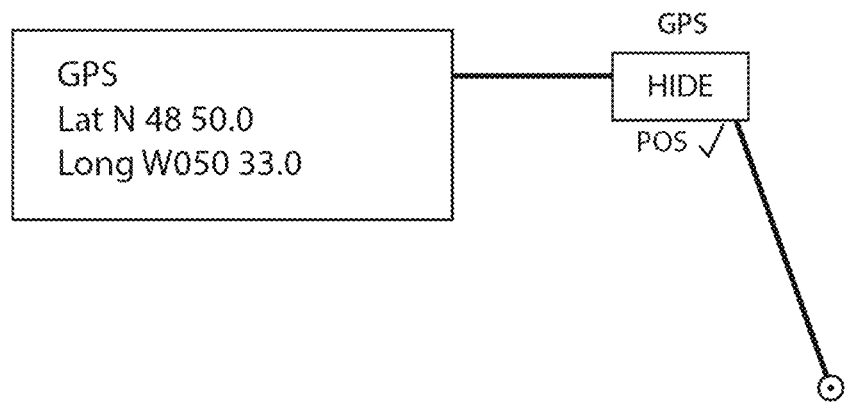

Figure 18 - Navigation System Position Check Sensor Listing

| Sensor Listing | | |
|---|---|---|
| RAW R/DME | FMS R/DME | GPS |
| | | |
| POS ✓ | | POS ✓ |
| FMS 1 | FMS 2 | FMS 3 |
| | | |
| | | ✓ |
| IRS 1 | IRS 2 | IRS 3 |
| | | |

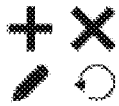
Figure 19- Flight Planning Checklist

Figure 20 - Preflight Checklist

| Preflight (At the A/C Prior to Dep) | | |
|---|---|---|
| Logbook & MEL Maint Check | Check | ✓ |
| Master Clock | Set to UTC or use GPS | ✓ |
| RVSM Altimeter Check | + - 75ft or A/C Criteria | ✓ |
| Wind Sheer/Turb Forecast for route | Note | ✓ |
| Long Range Nav Sys | Load & Verify | ✓ |
| Long Range Nav Sys Database | Check for currency | ✓ |
| HF SELCAL | Check | ✓ |
| Upload Projected Winds | If Able | ✓ |
| Ground Speed | Check Before Taxi | ✓ |

Figure 21 - Off Blocks Taxi Prior to Takeoff Checklist

| OFF Blocks Taxi Prior to Takeoff | | |
|---|---|---|
| Groundspeed | Check During Taxi | ✓ |
| Present Position | Check | ✓ |
| Departure Clearance | Obtain | ✓ |
| Time | Note T/O Time | ✓ |

Figure 22 - Prior to Coast Out

| Prior to Coast Out, Enroute to Outbound Gateway | | |
|---|---|---|
| HF Radio / SELCAL | Check if not done ground | ✓ |
| Altitude Capability | Determine | ✓ |
| ETA to outbound gateway w/in 2 min | Check | ✓ |
| SATCOM | Datalink Check Operational | ✓ |
| CPDLC | Log on 10-25 min prior to entry | ✓ |
| Oceanic Clearance | Obtain | ✓ |
| Oceanic Clearance | Load & Verify | ✓ |
| If Reclearance | Verify Cautiously | ✓ |
| RNP Value | Check RNP Value set in FMS | ✓ |
| Nav Sys Pos Accuracy | Check | ✓ |
| Weather | Update if Needed | ✓ |
| Altimeters Verify w/in 200ft Lvl Flt | Check/logged | ✓ |
| Cruise MACH | Establish | ✓ |
| Compass Heading | Check if IRS Only | ✓ |

Figure 23 - Approaching Waypoints Checklist

| Approaching Waypoints | | |
|---|---|---|
| CPDLC | Check During Taxi | ✓ |
| Confirm Next & Next +1 Waypoint | WPT, Track, Dis | ✓ |
| Advance Notification or have Entry... | Check | ✓ |

Figure 24 - Enroute After Passing Each Oceanic Waypoint

| Enroute After Passing Each Oceanic Wpt | | |
|---|---|---|
| Confirm CPDLC (CDA) Loggin In | | ✓ |
| Waypoint, Track, Dis | Verify | ✓ |
| HF/VHF Check Set | | ✓ |
| Transponder Set | NAT 2000, 20min after entry | ✓ |
| Fule | Monitor and record on Flt Plan | ✓ |
| Time | Moniter and update ETA... | ✓ |
| Position Report | CPDLC and or VOICE... | ✓ |
| SLOP | Consider best option | ✓ |
| 10 Minute Check | Plot FMS Position | ✓ |
| ETPs | Monitor | ✓ |
| Midway Along Route | Caputer Wind Drift Corr held | ✓ |
| Approaching Next Waypoint | Repeat Above | ✓ |

Figure 25 - Coast In Checklist

| Coast In | | |
|---|---|---|
| SLOP | Check During Taxi | ✓ |
| NAV Sys | Update using NAVAIDS... | ✓ |
| Route & Speed Assignment | Confirm | ✓ |
| Confirm CPDLC (CDA) Logged in | | ✓ |

Figure 26 - 10 Min Check

Figure 27- 10 minute check as posted on plotting chart
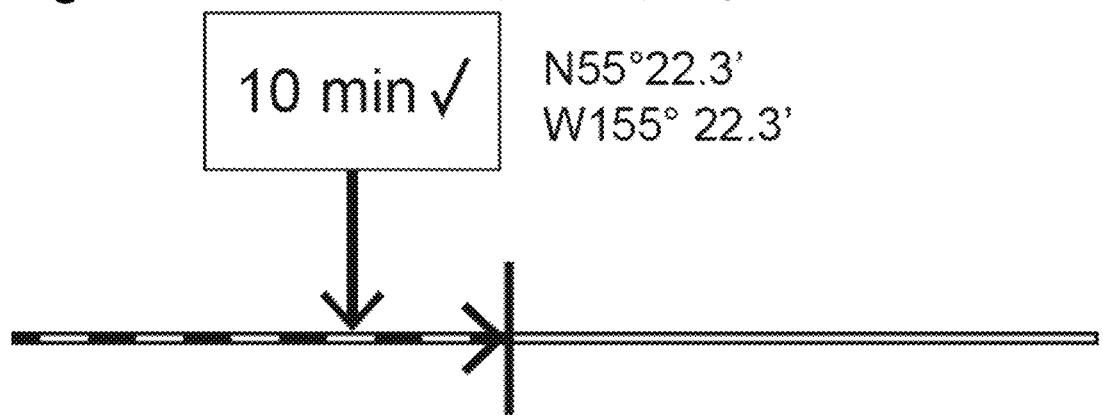

Figure 28 - Position Report Form

Figure 29 - Position Report Form Entry Boxes with new column added
Figure 30 - Custom Keypad for the Position Report Form

Figure 31 - Plot Position by Lat/Long with custom keypad
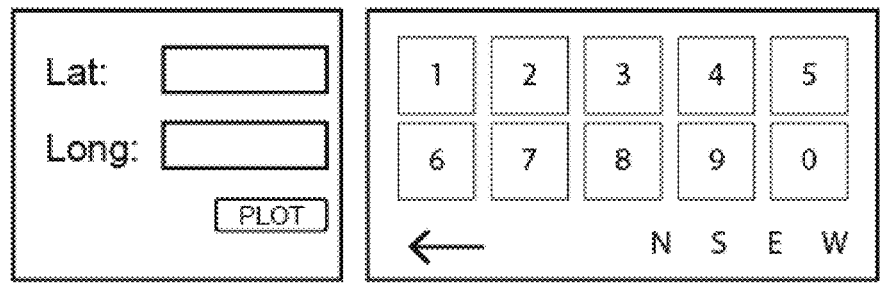
Figure 32 - Distance Tool
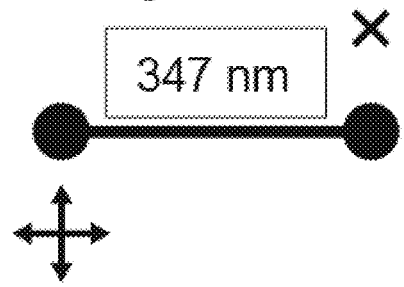
Figure 33 - Annotation tool menu
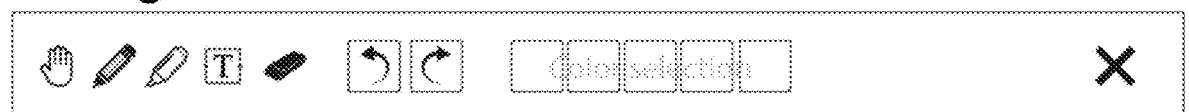
Figure 34 - ETP Depiction on route once processed, with labels included.
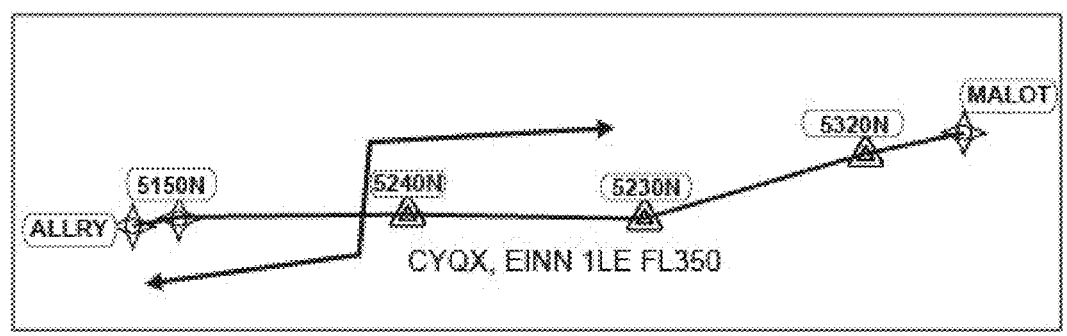

Figure 35- Two ETPs on a route depiction on Plotting Chart, with labels.
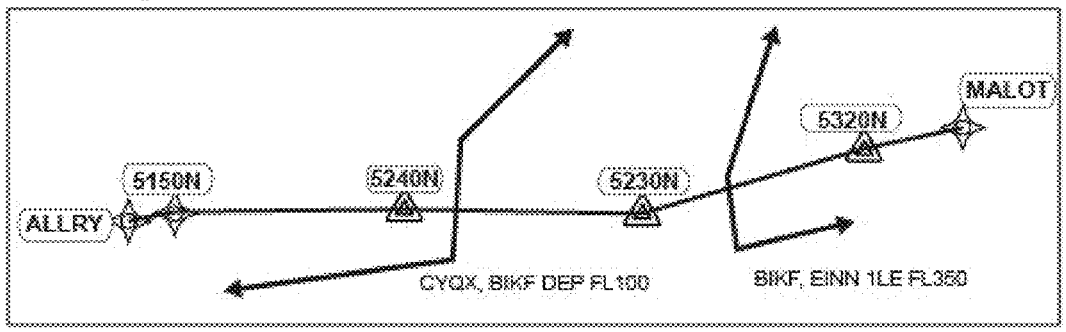
Figure 36- ETPs by LAT/LONG data entry form presentation.

Figure 37 - ETPs AUTOBUILD entry form
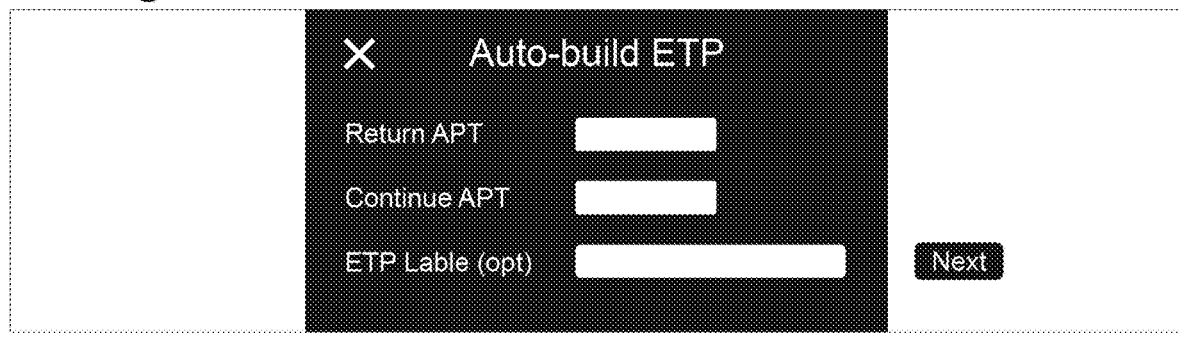
Figure 38a - Exact ETP - line bisecting the route indicates position of ETP.
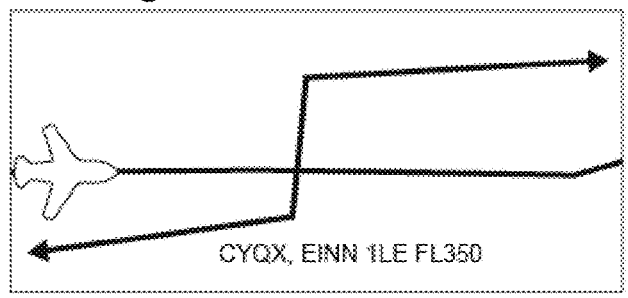
Figure 38b. Custom Keypad for entering ETPs
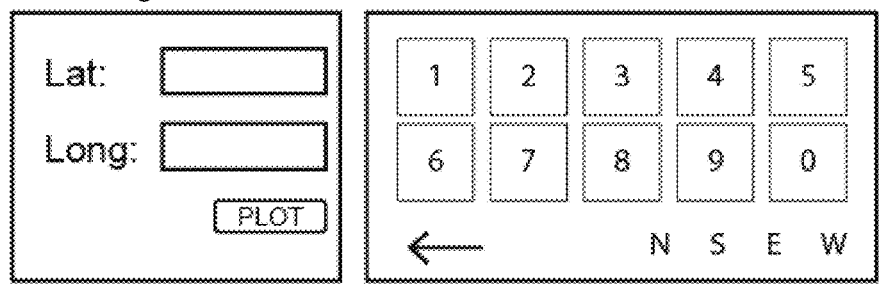

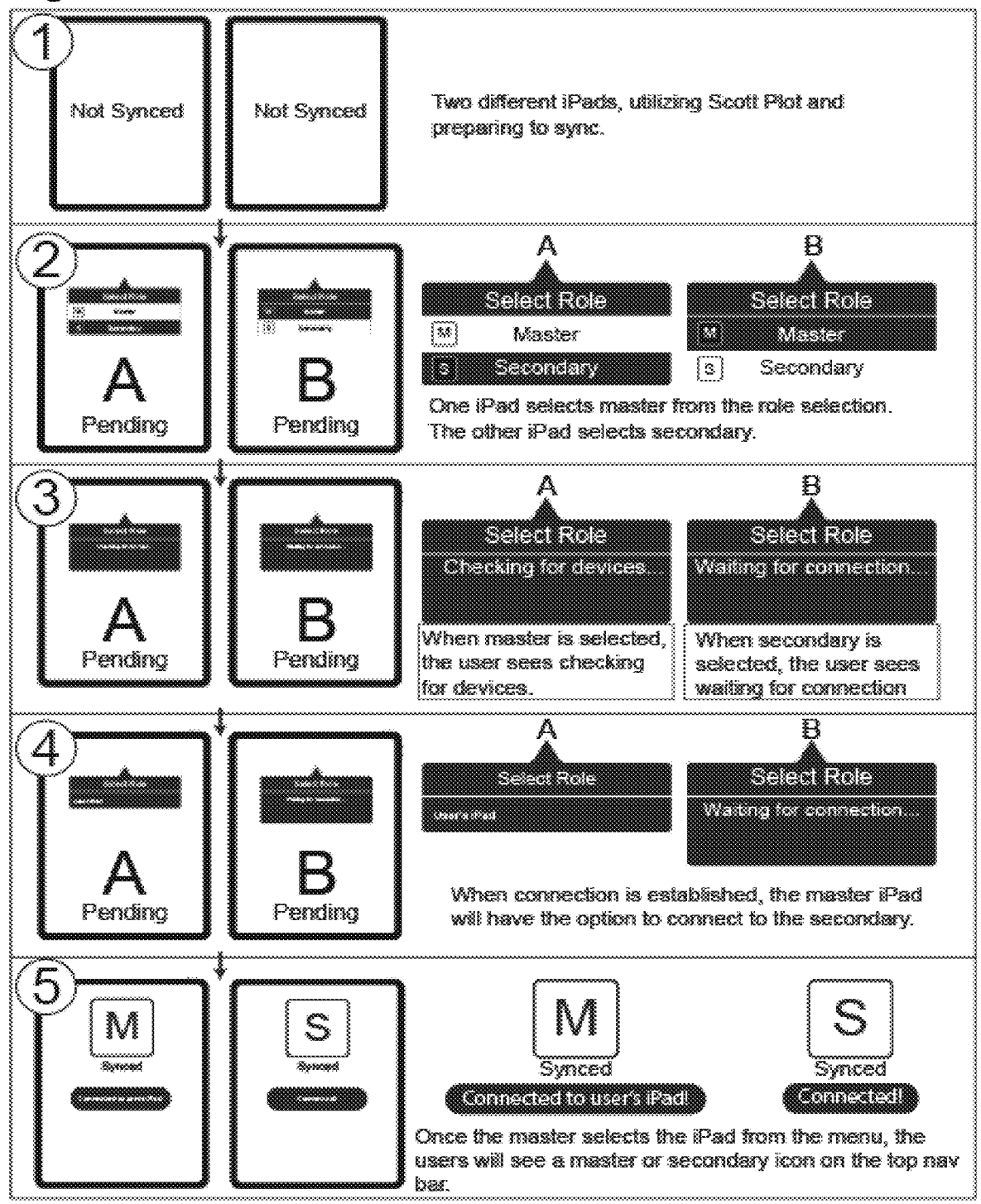
Figure 39- Sync Process for UI

Figure 40 - Master Icon
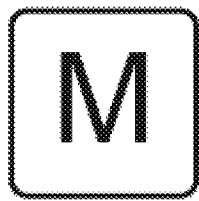
Figure 41 - Secondary Icon
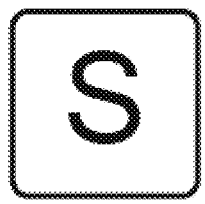
Figure 42 - Previous Master icon of syncing
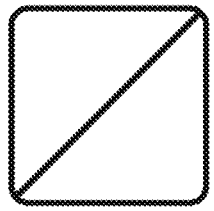
Figure 43 - Not Synced icon
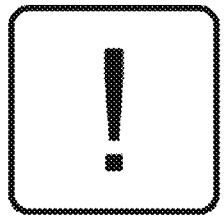

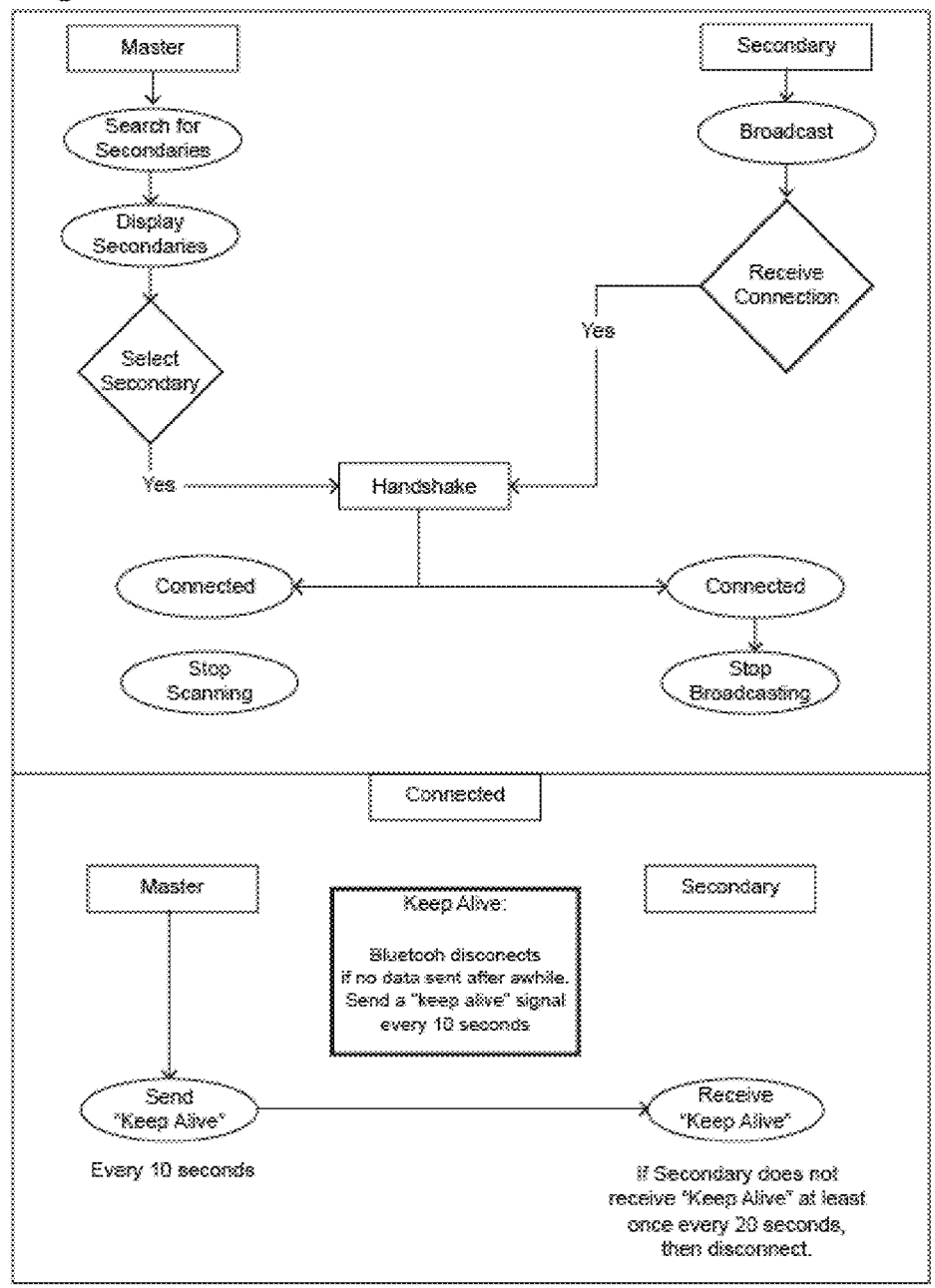
Figure 44a- Connection Process for linking Scott IPC navigation tools.

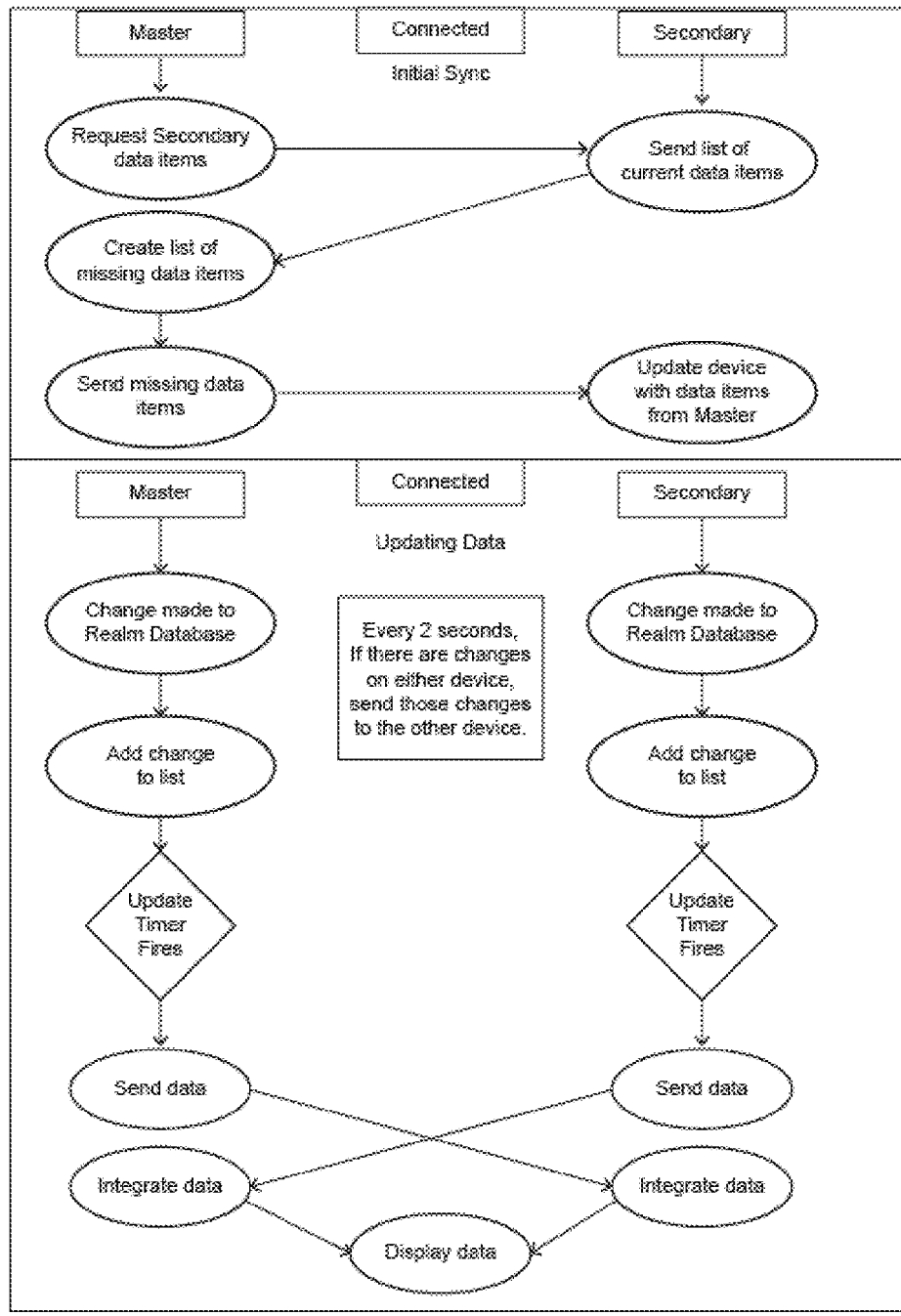
Figure 44b - Database Updating for Synced devices

Figure 45- Route Details shown on route segment with GPS active
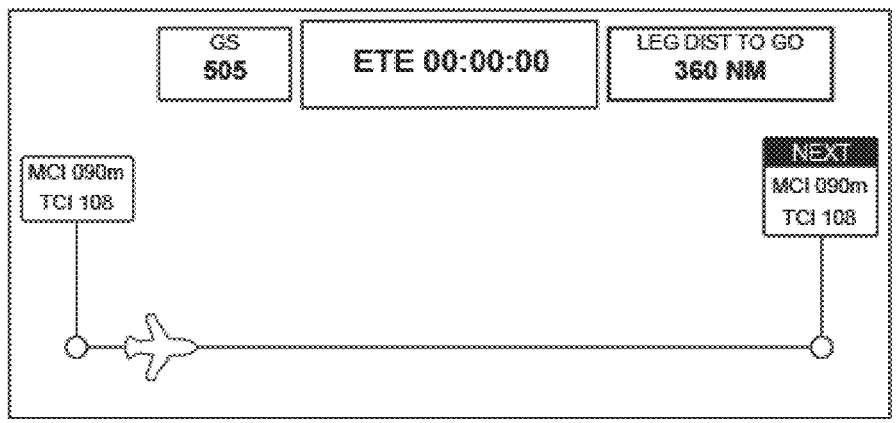
Figure 46- Route with winds entered
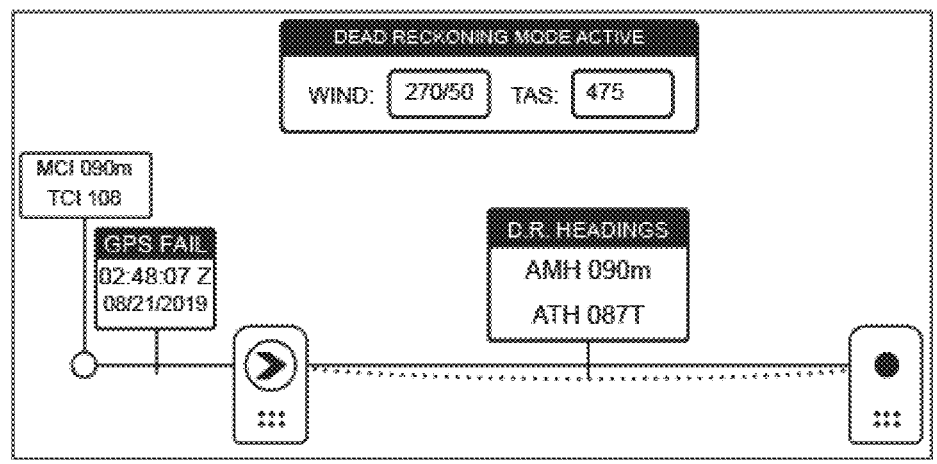

Figure 47 - GPS Timestamp
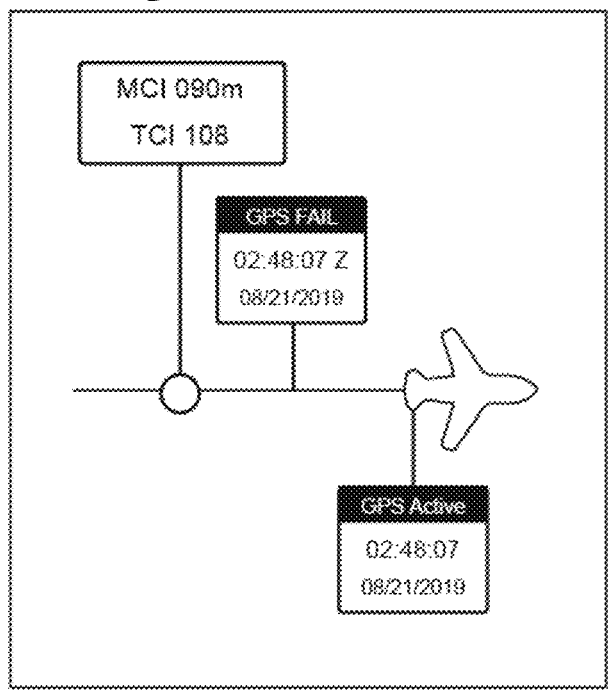
Figure 48 - Wind Correction Entry Form and Plotting Chart Stamp
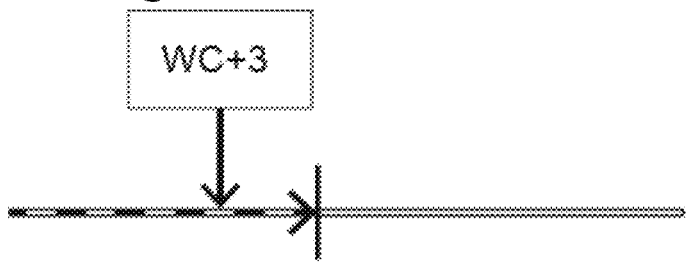

Figure 49- Selectable Layers
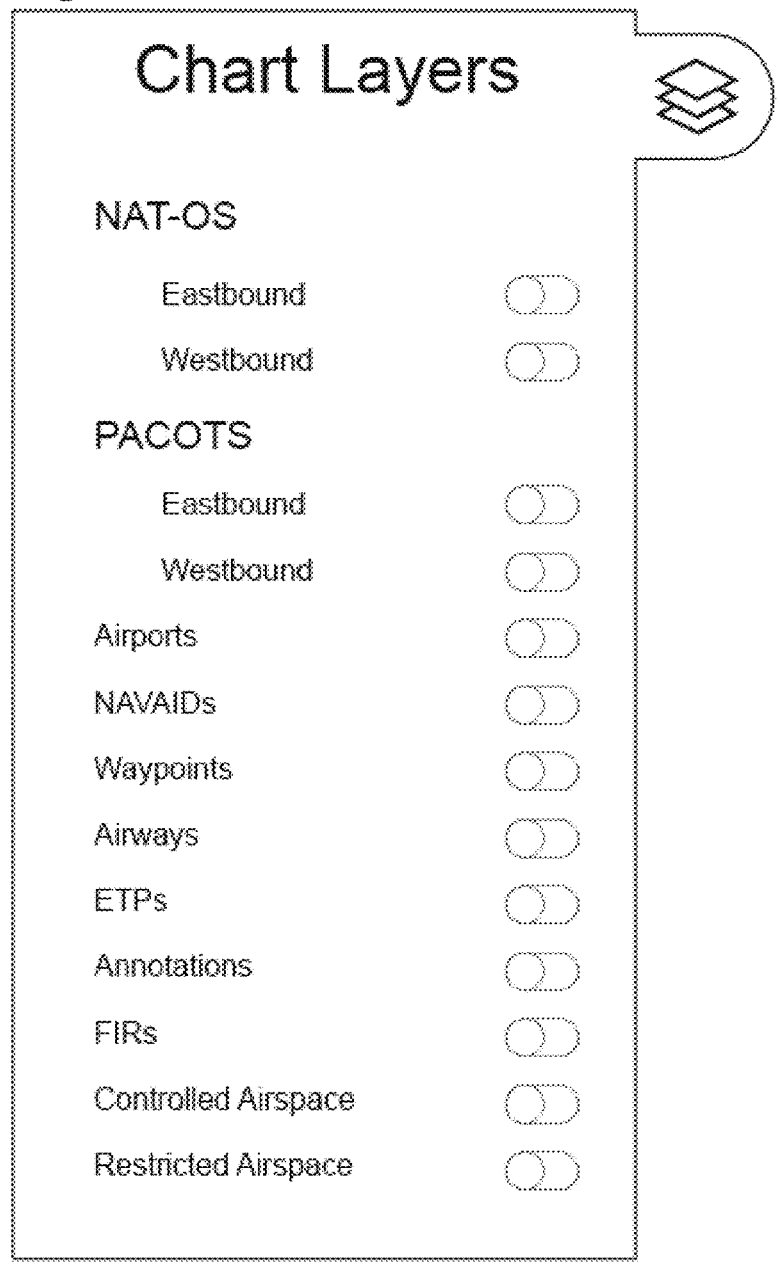
Figure 50- Track Message Icon- to select viewing of a full Track Message.
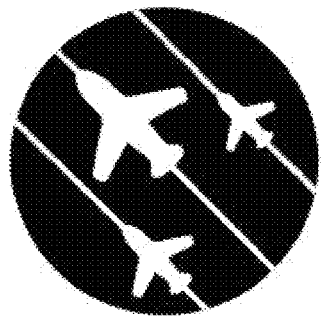

Figure 51- Auto Distance Layer depiction of distances for legs on Plotting Chart when Auto Distance tool is enabled
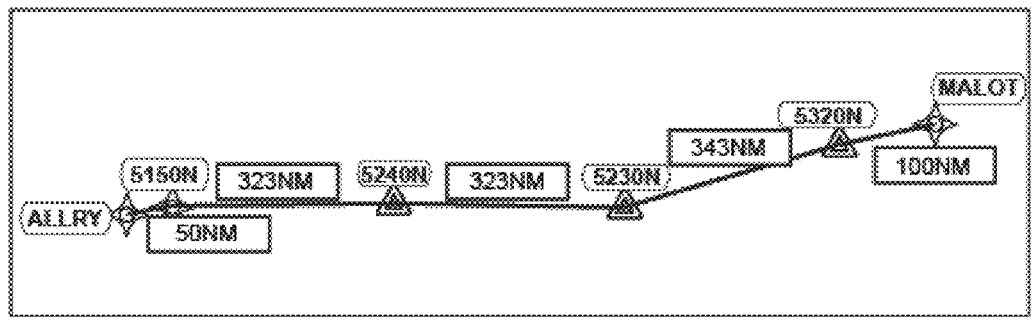
Figure 52- Speed-Distance Time Calculator
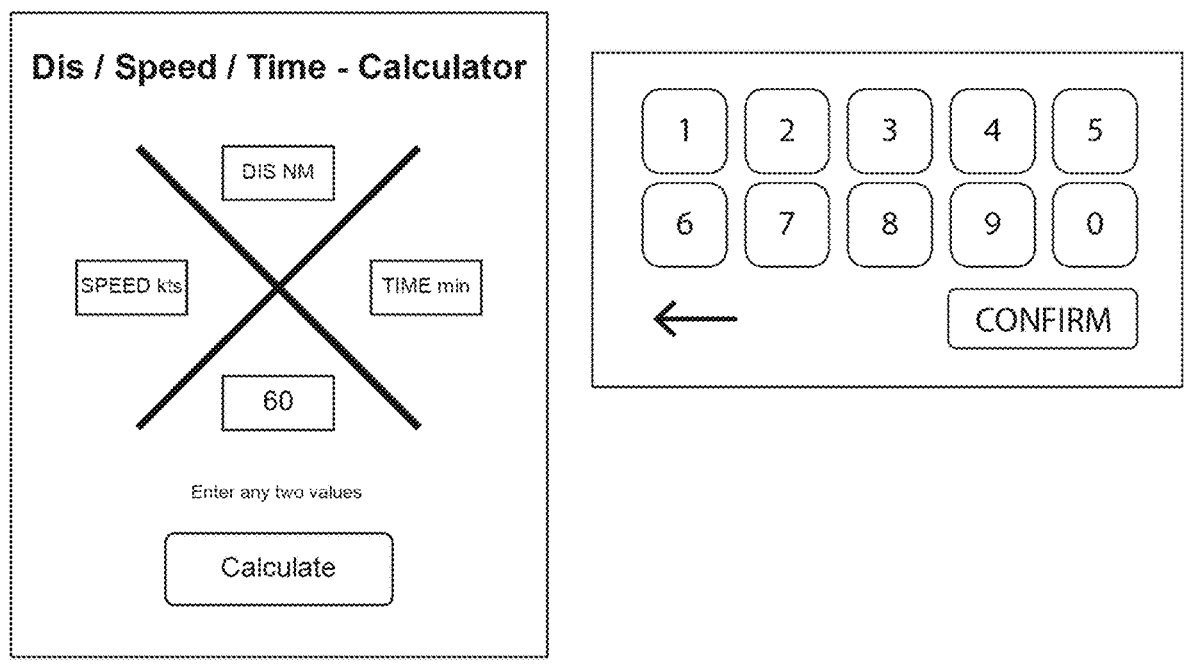
Figure 53- Freeplay Message
YOU ARE NOW IN FREEPLAY MODE - GPS INACTIVE

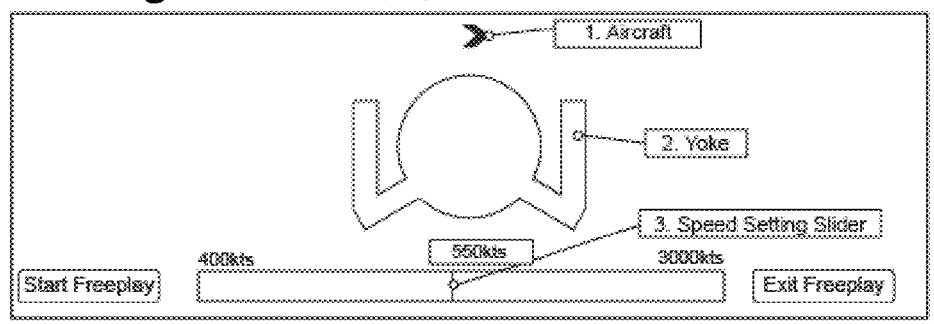
Figure 54 - Freeplay Screen Controls
Flag 1- Yoke
Flag 2- Speed Setting Slider
Flag 3- Red Chevron to represent aircraft

Figure 55 - Journey Logbook Entry Form

Journey Logbook (Required for International Airspace Flight) Journey Logbook will be generated at close of flight.

[EDIT MODE]

Select Flight Plan

Select Track Message

| A/C REG Tail # | N123S | A/C TYPE | G-IV | Dep DATE | 10/23/19 | FM | KPSM | TO | EINN |

PIC/CAPT: John Doe   SIC/FO: Jane Doe

Add CREW: Sally   Mae   + ADD CREW

Upload Journey Logbook to ScottIPC Portal at close out?   YES ○   NO ○

At Flight Close Out, send email of Journey Logbook? (Completed Plotting chart, Annotated Flt Plan, Journey Log notes if any.) If "NO" then created Journey Logbook PDF will only be stored on this iPad.   YES ●   NO ○ admin@myflights.com   [Add Email]

NOTES

[SAVE EDIT]   [POST (CLOSE OUT FLIGHT)]   [CANCEL]

Figure 56 - form for designating e-mail recipients of a PDF of completed Journey Logbook

Figure 57 - Zoom Level 1 Up to 80 degrees North latitude
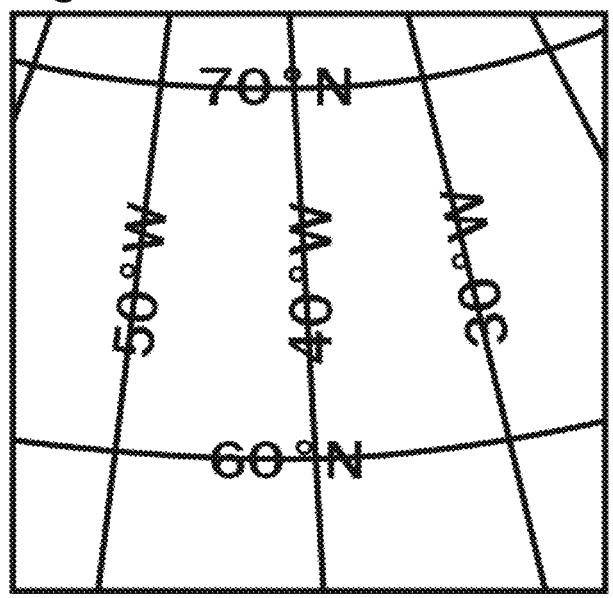
Figure 58 - Zoom Level 1 From 80 to 90 degrees latitude
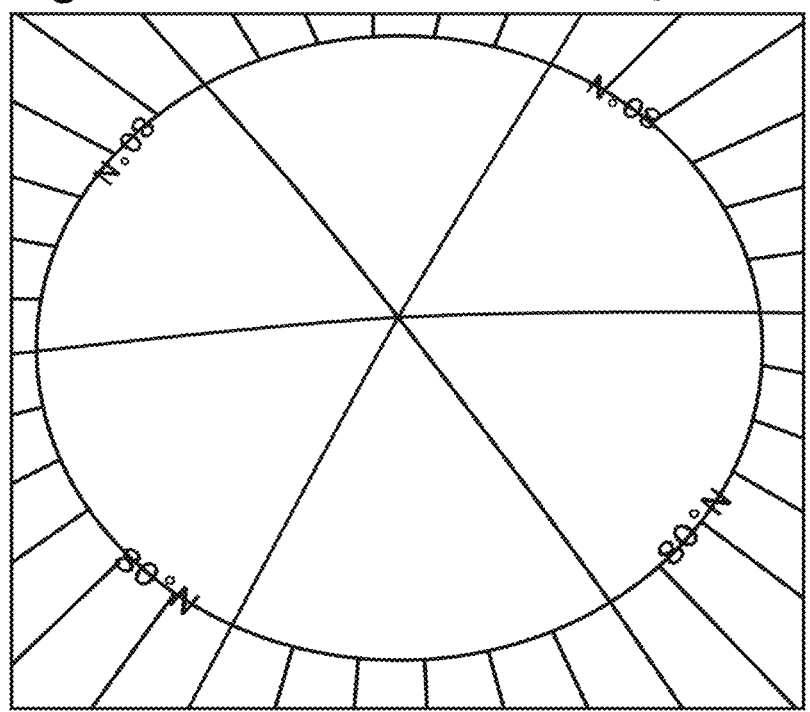

Figure 59 - Zoom Level 2 Up to 80 degrees Latitude
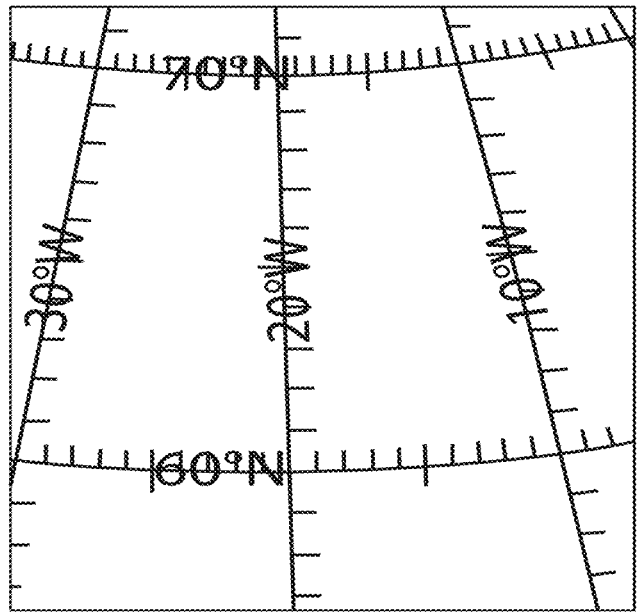
Figure 60 - Zoom Level 2 From 80 degrees latitude
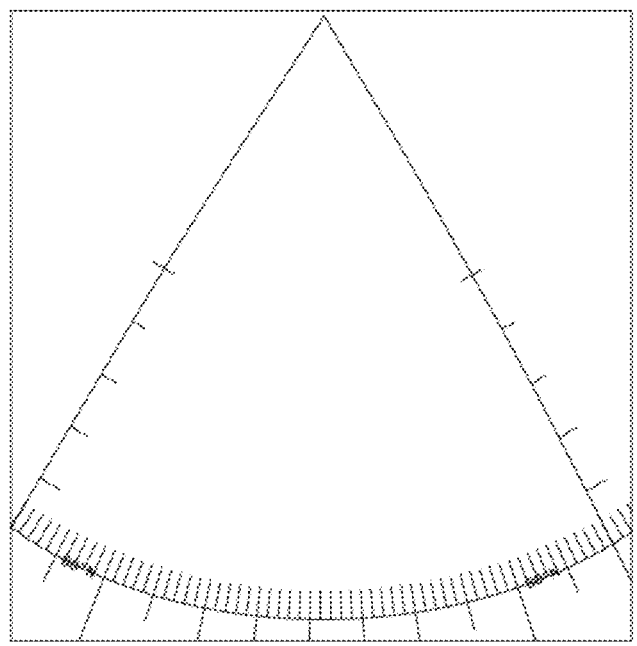

Figure 61 Zoom Level 3 Up to 70 degrees latitude
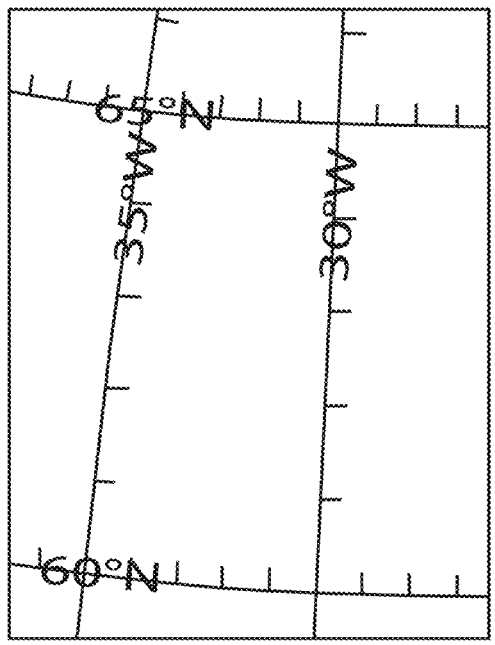
Figure 62 Zoom Level 3 from 70 to 80 degrees latitude
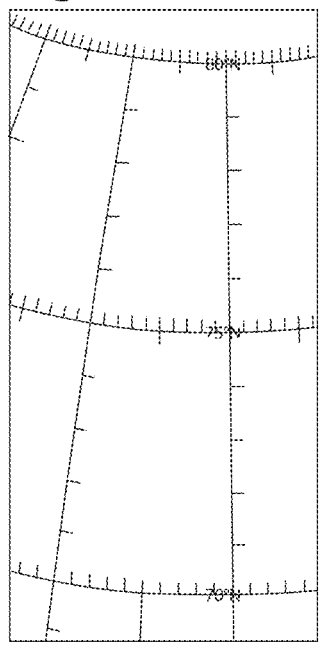

Figure 63 Zoom Level 4 Up to 80 deg latitude
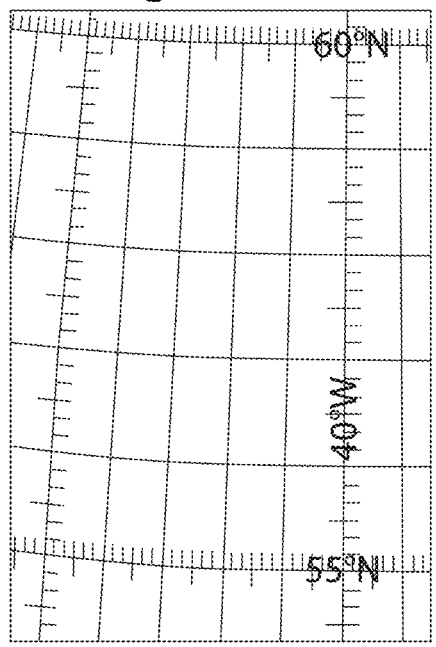
Figure 64 zoom level 5 up to 80 degrees latitude
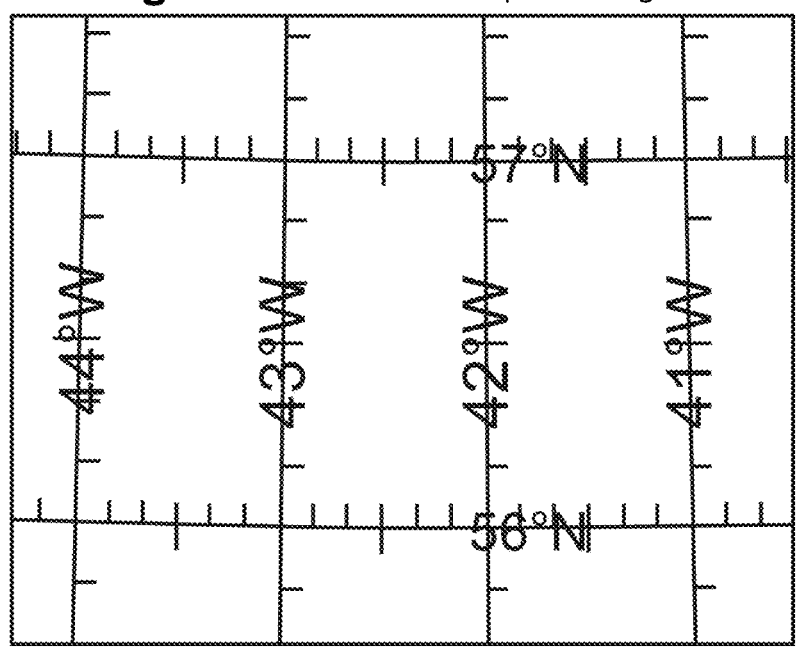

Figure 65 zoom level 6
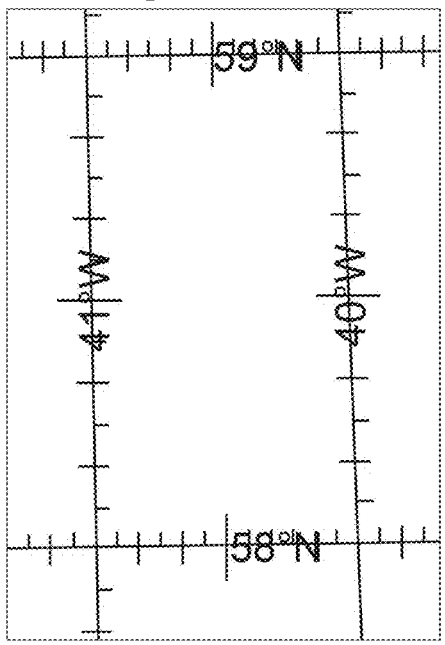
Figure 66 zoom level 7
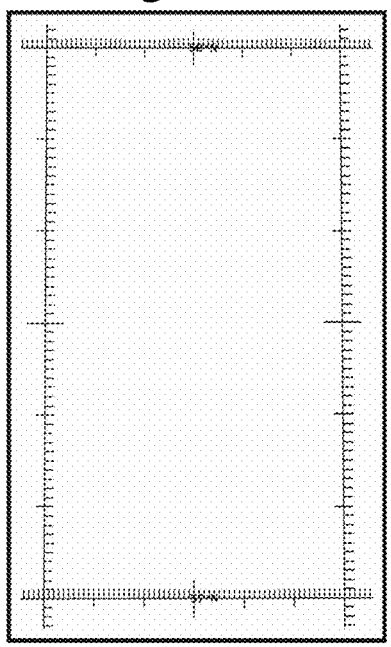

Figure 67 Present Position (PP) Direct to entry form
For LAT/LONG: N 48 00.0' / W 050 00.0'
Format for Named: KLAX, DOTTY 4850N = 48N 050W | H4850 30'N 050W
Figure 68 - Set Chart Area Frame
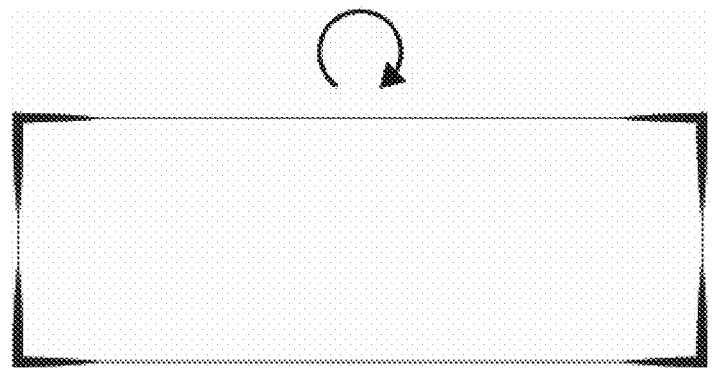

Figure 69- Preflight Setup Wizard
Figure 70- Preflight wizard Check for Update page
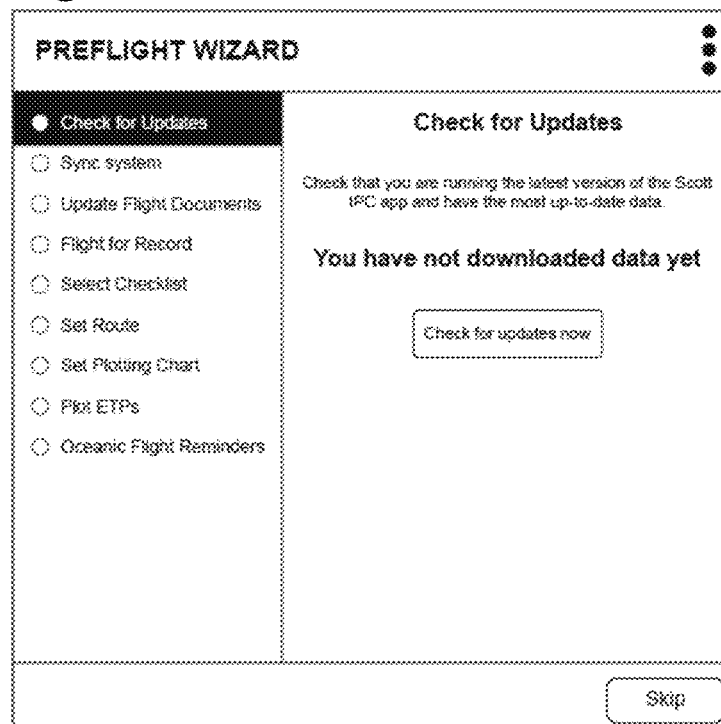

Figure 71 - Preflight Wizard Sync devices screen
Figure 72. Preflight Wizard Download Flight Documents screen

Figure 73 - Preflight Wizard establishing a flight for record screen
Figure 74 - Preflight Wizard Selection of Checklist to use for flight screen

Figure 75- Preflight Wizard Build a route starting screen

Figure 76- Preflight Wizard setting chart area start screen

Figure 77- Preflight Wizard Building ETP starting screen

Figure 78 - Preflight Wizard Set Oceanic Flight Reminders Preferences selection screen, enabling users to turn on/off flight reminders

PORTABLE FLIGHT NAVIGATION TOOL ADAPTED TO ASSIST PILOTS IN COMPLIANCE WITH INTERNATIONAL FLIGHT PROCEDURES AND NAVIGATION

CROSS REFERENCE TO RELATED APPLICATIONS

This application claims priority to U.S. Provisional Application No. 62/745,879 filed on Oct. 15, 2018, the contents of which is hereby incorporated herein by reference in its entirety.

BACKGROUND

Most aircraft pilots are familiar with operations within their home country. When these pilots operate across borders, they become subject to laws and rules imposed by other countries that may differ from those that they are used to. U.S. Code of Federal Regulations 14 CFR 91.703— Covers: Operations of civil aircraft of U.S. registry outside of the United States. It states in part:

(a) Each person operating a civil aircraft of U.S. registry outside of the United States shall—

(1) When over the high seas, comply with Annex 2 (Rules of the Air) to the Convention on International Civil Aviation and with §§ 91.117(c), 91.127, 91.129, and 91.131;

(2) When within a foreign country, comply with the regulations relating to the flight and maneuver of aircraft there in force These laws and rules include differing standards and contact information for preflight weather briefings, filing visual flight rules (VFR) and instrument flight rules (IFR) flight plans, obtaining and receiving clearances, customs rules including arrival notification and port of entry requirements, position reporting requirements, metric versus English altitude requirements, designated airways and transatlantic tracks, prohibited and restricted areas, aircraft identification zones, warning and alert areas, and other rules. Violations, whether intentional or from ignorance, of these rules may have drastic legal consequences and may impair safe operations of both the violating pilot and other aircraft. Aside from the safety concern, violating aircraft have even been shot down. It is mandatory for commercial operators to train pilots in international operations, and in particular transoceanic operations, prior to their engaging in such operations; and to provide inflight reference information for their use during such operations.

Global satellite navigation systems have been installed by the United States, Europe, Russia, and other countries. The United States system is known as the Global Positioning System, the Europe system is known as Galileo, and the Russian system as Global Navigation Satellite System or GLONASS. For purposes of this document, the term "GPS receiver" includes a receiver capable of receiving position information from any one or more of the Global Positioning System, GLONASS, Galileo and other future satellite-based navigation systems.

The term "tablet computer" as used herein shall include portable computing devices having an internal processor, random access memory, nonvolatile memory, capable of operation on an internal battery, and having a touch-panel display. Tablet computers may run the iOS operating system from Apple®, the Android operating system, or the Microsoft Windows operating system.

The term "tracks" includes routes of an organized route system published by air traffic control authorities and frequently flown by aircraft on international overwater flights; tracks exist worldwide and include but are not limited to tracks of the North Atlantic Organized Track System, the Transpacific Organized Track System, and the Australian Organized Track Structure; in some regions published tracks of organized track systems are updated frequently, with the North Atlantic track system being updated as often as twice daily.

Nonvolatile memory includes one-time programmable and electrically erasable memory of the type that operates by storing electrostatic charge on a floating gate or on a silicon nitride-silicon dioxide interface under a gate of a transistor. Nonvolatile memory is characterized by the ability to retain data contents for more than an hour without the data contents being refreshed, and includes several types of magnetic memory including core memory.

SUMMARY

An app known as the Scott IPC app, is configured to download over a cellular or IEEE 802.11 Wi-Fi internet connection and run on an Apple iPad® (trademark of Apple, Cupertino, Calif.), the Apple iPad being a particular brand of tablet computer adapted to run the iOS operating system; future versions of the Scott IPC app may be configured to run on alternative tablet computers. The Scott IPC app configures the Apple iPad to operate independent of an internet connection allowing the Apple iPad to operate as a portable navigation tool, the Scott IPC navigation tool, that is adapted to assist pilots in compliance with international flight procedures and navigation. The Scott IPC flight navigation tool contains several tools including an International Cockpit Reference Handbook (ICRH) with information useful to pilots operating in and between many countries around the world with a focus on International Oceanic Operations. Rules included in the Scott IPC flight navigation tool include national rules published in many national Aeronautical Information Publications as updated and International Civil Aviation Organization (ICAO) rules applicable beyond 12 nautical miles (NM's) off a coastline in international airspace.

Cellular-network capable iPads have an integral Global Positioning System (GPS) satellite navigation system receiver that allows determination of an approximate location. The Scott IPC flight navigation tool operate as an independent International Oceanic Navigation Assistance Flight Tool which functions with or without incorporating a GPS.

Position recenterable, precise Plotting Chart map display showing Latitude and Longitude graticule lines capable to zooming to more than a 1-minute arc accuracy allows for plotting precise Latitude and Longitudes, user-selected and user-entered waypoints, tracks, airways, and key airspace boundaries and features of oceanic airspace including selectable world-wide area of coverage. The Scott IPC flight navigation tool can serve as a Dead Reckoning navigational tool allowing near-precise navigation when navigation GPS sensor information is unavailable. This allows conflict resolution from other aircraft and accurate navigation given an aircraft navigation system failure.

Embodiments of the Scott IPC flight navigation tool can be linked by Wi-Fi or Bluetooth connections to an Automatic Dependent Surveillance Broadcast (ADS-B) receiver to provide a user with traffic advisories and other real-time aircraft information when in range of other aircraft.

In embodiments, the Scott IPC flight navigation tool supports slaving a second Scott IPC flight navigation tool to a master Scott IPC flight navigation tool; this permits both a pilot and a copilot to have access to the same data and thereby an ICAO requirement to only have one Master Document on the flight deck at a time. This ensures pilots are not making decisions using independent or conflicting information entered on either Scott IPC flight navigation tool as such devices are synced.

In an embodiment, a portable flight navigation tool for use in aircraft has a tablet computer, a GPS receiver, and a memory system incorporating nonvolatile memory, the nonvolatile memory contains an operating system, a flight navigation routine, an aviation database with international operating rules including transoceanic flight rules, machine readable code configured to display portions of the international operating rules upon demand, a moving-map database configured with transatlantic, transpacific, and other tracks, coastal airport identifiers and locations, predefined routes, and predefined reporting point locations for transoceanic operations. The navigation tool also includes machine readable code configured to read a current location from the GPS receiver, and to indicate the current location on a moving map display representing a portion of the moving-map database, and a trip database with machine readable code configured to interface with a user with a touchscreen and to use either direct entry of waypoint coordinates or names and selection of predefined tracks to configure the trip database with a planned transoceanic route for an individual flight.

In embodiments, the flight navigation tool also has a checklist database and machine-readable code for comparing the current location with popup display locations at which checklists from the checklist database are automatically displayed on the moving map display; in some embodiments the checklist database is user configurable and the checklist database includes checklists for a pre-departure flight phase, a coast-out flight phase, a waypoint-reached flight phase, and a coast-in flight phase.

In embodiments, the flight navigation tool displays graticule lines at a density of 60 lines per degree of longitude that decreases with increasing latitude; and may also provide a heading and next-waypoint timing for a rhumb-line route from a location where the GPS fails to the next waypoint of the currently active route.

In embodiments the flight navigation tool is configured to link to a second flight navigation tool over a short-range radio as a flight navigation tool pair, the flight navigation tool configured to identify flight navigation tools of the pair as a master flight navigation tool and a secondary flight navigation tool, and includes code to synchronize the flight navigation tools of the pair by transmitting updates from a trip database of the secondary flight navigation tool to the master flight navigation tool and update the trip database of the secondary flight navigation tool from the trip database of the master flight navigation tool, and to send a heartbeat message repeatedly from the master flight navigation tool to the secondary flight navigation tool.

In another embodiment, a method of assisting pilots performing overwater flight operations includes providing a portable navigation tool having a GPS receiver and a memory system having recorded therein a moving-map database configured with transatlantic, transpacific, and other tracks, coastal airport identifiers and locations, and predefined routes and predefined reporting point locations for transoceanic operations, with machine readable code configured to read a current location from the GPS receiver, and to indicate the current location on a moving map display representing a portion of the moving-map database. The portable navigation tool also contains a trip database. The method includes interfacing with a user with a touchscreen to configure the trip database with a planned transoceanic route for an individual flight by direct entry of waypoint coordinates or names and selection of predefined. The method includes reading a current location from the GPS receiver, and indicating the current location on a moving map display representing a portion of the moving-map database, comparing the current location with checklist display locations, and displaying checklists from a checklist database upon reaching checklist display locations; in some embodiments the checklist database is user configurable and has checklists for at least a pre-departure flight phase, a coast-out flight phase, a prior to waypoint-flight phase, a waypoint-reached flight phase, and a coast-in flight phase.

In some embodiments, the method includes displaying the moving map display with graticule lines at a density of 60 lines per degree of longitude that decreases at high latitudes, and provides pilots with a heading and next-waypoint timing for a rhumb-line route from a location where the GPS fails to the next waypoint of a currently active route.

BRIEF DESCRIPTION OF THE FIGURES

FIG. 1 is a menu of switches to permit setting Oceanic Flight Reminders to be delivered enroute for a pilot thru the reminder tool by phase of flight.

FIG. 1A illustrates a tablet computer adapted to be powered by an internal battery or a power socket useful as an International Oceanic Navigation Assistance Flight Tool by pilots in an aircraft.

FIG. 1B is an illustration of the Home Screen of the Scott IPC navigation tool with main menu icons that user can access from all locations within the tool, as detailed below.

FIG. 2 is an illustration of a GPS icon indicating GPS functions are disabled to alert the pilot that the GPS function is currently disabled.

FIG. 3 is an illustration of a GPS icon indicating GPS functions are active, this icon is always present and Green when GPS function is currently available and being used for calculations.

FIG. 4 is an illustration of a GPS icon indicating GPS is unusable, the icon is white, surrounded by a red circle with a red line when GPS is unusable or unavailable.

FIG. 5 is an illustration of a GPS menu indicating GPS is Active (green), with menu selections (white) for requests to Center GPS and Disable GPS.

FIG. 6 is an illustration of a GPS menu indicating GPS functions are Inactive (Amber), with (white) a menu to Enable GPS.

FIG. 7 is an illustration of GPS FAIL and ACTIVE Stamps that may be displayed on a moving-map Plotting Chart display indicating location and times of GPS failure and re-acquisition of GPS signal.

FIG. 8 is an illustration of an Auto Plot Oceanic Route builder entry form, with indication of correct format of entries.

FIG. 9 is an illustration of a Confirm Delete Waypoint popup provided to pilots prior to deleting a waypoint from a route.

FIG. 10 is an illustration of a Modify Routes Drag and Drop magnification viewer allowing pilots to accurately drag and drop a waypoint to a new position while entering a route.

FIG. 11 is an illustration of a popup that permits users to set a "snap to" mode for precise drag and drops.

FIG. 12 is an illustration of a Navigation System Position Check Form that permits aircraft Navigation System Sensor position entry to confirm accurate GPS function.

FIG. 13 is an illustration of RAW R/DME A/C sensor position shown on the Plotting Chart after conversion from pilot entered VOR selection, Radial, and DME Distance to Latitude and Longitude.

FIG. 14 is an illustration showing a FMS R/DME calculated exact position shown on plotting Chart after pilot entry of raw R/DME data into the accuracy check form of FIG. 12.

FIG. 15 is an illustration of FMS1, FMS2, and FMS3 positions shown on the moving Plotting Chart display after pilot entry into the accuracy check form.

FIG. 16 is an illustration of IRS1, IRS2, and IRS3 positions shown on the Plotting Chart display after pilot entry into accuracy check form.

FIG. 17 is an illustration of GPS exact positions shown on plotting Chart after pilot entry into the accuracy check form.

FIG. 18 is an illustration of a Navigation System Position Check Sensor selection list allowing pilots to view each aircraft sensor type individually on the Plotting Chart display.

FIG. 19 is an illustrative example of a Flight Planning Checklist; this flight planning checklist is an interactive, modifiable checklist allowing pilots to identify outstanding issues prior commencement of the flight.

FIG. 20 is an illustrative example of a Preflight Checklist; this interactive, modifiable checklist allowing pilots to identify outstanding issues during aircraft preflight.

FIG. 21 is an illustrative example of an Off Blocks Taxi Prior to Takeoff Checklist; this interactive, modifiable checklist allows pilots to identify outstanding issues prior to take-off.

FIG. 22 is an illustrative example of a Prior to Coast Out, Enroute to Outbound Gateway interactive modifiable checklist indicating required items to verify before entering overwater international airspace.

FIG. 23 is an illustrative example of an Approaching Waypoints Checklist; an interactive, modifiable checklist allowing the pilots to identify procedures and issues as waypoints are approached.

FIG. 24 is an illustrative example of an Enroute After Passing Each Oceanic Waypoint checklist, this checklist is an interactive, modifiable checklist presenting pilots items to address after passing waypoints.

FIG. 25 is an illustrative example of a Coast In Checklist; this checklist is an interactive, modifiable Coast In Checklist presenting items to address entering domestic airspace.

FIG. 26 is an illustration of a 10 Minute Check data entry form that allows a pilot to enter Latitude and Longitude to verify the aircraft's position on the plotting chart.

FIG. 27 is an illustrative example of a 10 minute check as posted on plotting chart.

Figure 28:
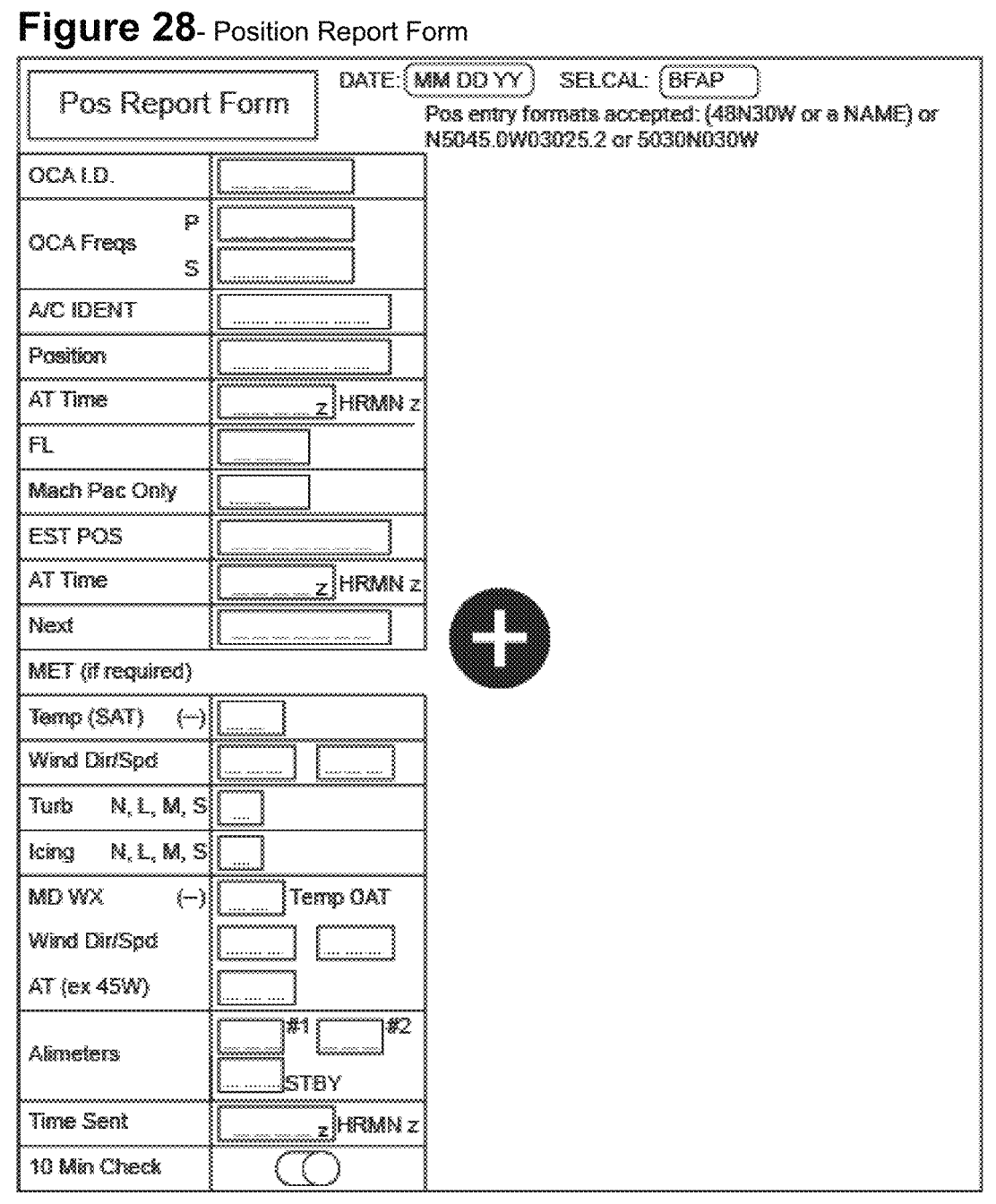

FIG. 28 is an illustrative example of a Position Report Form that allows pilots to capture needed items for use in sending position reports to ATC.

FIG. 29 is an illustrative example of a Position Report Form after adding a new column for multiple position reports.

FIG. 30 is an illustrative example of a Custom Keypad for touchscreen entry to the Position Report Form.

FIG. 31 is an illustrative example of a custom keypad for quick touchscreen entry into a Plot Position by Lat/Long form.

FIG. 32 is an illustrative example of a Distance Tool allowing measurement of routes and route segments on the plotting chart display.

FIG. 33 is an illustrative example of an Annotation Tool menu for entry of notes for display on flight plan and Plotting Chart displays.

FIG. 34 is an illustrative example of an ETP (equal time point) Depiction on a route displayed on the Plotting Chart display once processed, with labels included.

FIG. 35 is an illustrative example of two ETPs depicted on a route displayed on the Plotting Chart, with labels.

FIG. 36 is an illustrative example of ETPs by LAT/LONG data entry form presentation.

FIG. 37 is an illustrative example of an ETPs AUTO-BUILD entry form presentation for capturing alternate airports to use.

FIG. 38*a* is an illustrative example of an Exact ETP presentation with a line bisecting the route to indicate position of the ETP.

FIG. 38*b* is an illustrative example of a Custom Keypad used for entering ETPs into the ETPs by LAT/LONG data entry form of FIG. 36.

FIG. 39 illustrates a Sync Process user status display proceeding through four states, where paired Scott IPC navigation tools progress from unsynched through a role selection state, and a synch pending state to a synchronized state where one Scott IPC navigation tool is a master tool and the other of the pair is a secondary tool.

FIG. 40 illustrates a Master Icon as shown on the master Scott IPC navigation tool.

FIG. 41 illustrates a Secondary Icon as shown on the secondary Scott IPC navigation tool.

FIG. 42 illustrates a Previous Master icon as shown on a previous Master Scott IPC flight navigation tool after disconnection of syncing.

FIG. 43 illustrates a Not Synced icon as shown when a Scott IPC flight navigation tool is not synced with its paired tool.

FIG. 44*a* is a flowchart illustrating how Scott IPC navigation tools become linked as Master and Secondary tools.

FIG. 44*b* is a flowchart illustrating initial data entry and synchronization of trip databases and use of realm databases to store, synchronize, and display changes on and between paired Scott IPC flight navigation tools, maintaining a single record for Journey Logbook.

FIG. 45 is an illustration of Full Route Details displayed on the Plotting Chart display on a route segment when Full Route details is selected with GPS active.

FIG. 46 is an illustration of a route displayed on the Plotting Chart display with winds entered.

FIG. 47 is an illustration of GPS failure and re-acquisition timestamps on the Plotting Chart display while viewing Full Route Details.

FIG. 48 is an illustration of a Wind Correction Entry Form popup with custom keypad and a Plotting Chart Stamp showing wind correction information on the Plotting Chart display.

FIG. 49 is an illustration of a Selectable Layers menu use for selecting layers for depiction on the Plotting Chart display.

FIG. 50 illustrates a Track Message Icon for selecting viewing of a Track Message.

FIG. 51 illustrates an Auto Distance Layer depiction of distances for all legs on the Plotting Chart display when Auto Distance tool is enabled.

FIG. 52 illustrates a Speed-Distance Time Calculator form and custom touchscreen keyboard used with the Speed-Distance time calculator.

FIG. 53 illustrates a Freeplay Message warning the user is not using GPS but is in the Freeplay training mode.

FIG. 54 illustrates Freeplay Screen Controls allowing user to control the speed and direction of the simulated aircraft in Freeplay mode; in this mode Flag 1 is a yoke, flag 2 is a speed setting slider, and flag 3 is a red chevron representing the aircraft.

FIG. 55 illustrates a popup form for Journey Logbook Entries indicating basic entries and disposition of Journey Logbook after flight close-out.

FIG. 56 illustrates a form popup for designating up to ten e-mail recipients for a PDF copy of completed Journey Logbooks.

FIG. 57 illustrates zoom level 1 as displayed for up to 80 degrees North latitude.

FIG. 58 illustrates zoom level 1 as displayed from 80 to 90 degrees latitude.

FIG. 59 illustrates zoom level 2 Up to 80 degrees latitude.

FIG. 60 illustrates zoom level 2 From 80 degrees latitude.

FIG. 61 illustrates zoom level 3 Up to 70 degrees latitude.

FIG. 62 illustrates zoom level 3 from 70 to 80 degrees latitude.

FIG. 63 illustrates zoom level 4 Up to 80 deg latitude.

FIG. 64 illustrates zoom level 5 up to 80 degrees latitude.

FIG. 65 illustrates zoom level 6.

FIG. 66 illustrates zoom level 7.

FIG. 67 illustrates a Present Position (PP) Direct To entry form that defaults to current GPS position but is user overwritable.

FIG. 68 illustrates a Set Chart Area Frame tool depiction which can be rotate or resized when setting a coverage area.

FIG. 69 is a Preflight Setup Wizard that assists in completing all steps necessary to use the ScottPlot tool on an oceanic flight.

FIG. 70 illustrates a Preflight Wizard "Check for Update" page that permits users to check for ARINC data updates to provide current tracks and other necessary flight information.

FIG. 71 illustrates a Preflight Wizard "Sync Devices" display.

FIG. 72 illustrates a Preflight Wizard "Download Flight Documents" display.

FIG. 73 illustrates a Preflight Wizard establishing a flight for record screen.

FIG. 74 illustrates a Preflight Wizard Selection of Checklist menu.

FIG. 75 illustrates a Preflight Wizard Build a route starting screen.

FIG. 76 illustrates a Preflight Wizard setting Chart area start screen.

FIG. 77 illustrates a Preflight Wizard Building ETP starting screen.

FIG. 78 illustrates a Preflight Wizard Set Oceanic Flight Reminders Preferences selection screen, enabling users to turn on/off reminders.

DETAILED DESCRIPTION OF THE EMBODIMENTS

An aircraft 102 (FIG. 1A) engaged in overwater international operations carries in its cockpit one, or preferably two, Scott IPC flight navigation tools 104, 105. The flight navigation tools 104 are typically provided one for each of, and accessible to, a pilot 124 and copilot 125. Each Scott IPC flight navigation tool 104 includes a tablet computer configured with power from an internal battery 106 and has as a battery charger 108 adapted for connection through an external power adapter 110 to aircraft power to ensure operation during long flights. Each flight navigation tool 104 has a processor 112 coupled to an internal GPS 114, memory 116, touchscreen display 118, and digital radios 120 adapted for IEEE 802.11 Wi-Fi and Bluetooth network connectivity. The flight navigation tools, typically implemented using Apple iPad tablet computers, are configured with a Scott IPC app 122 in memory 116, the Scott IPC app configures the iPads as flight navigation tools 104, 105 by providing machine readable code adapted to configure a trip database 130. The flight navigation tools are configured to be linked together through digital radios 120 and serve as an international procedures tool useful to the pilot 124 and copilot (not shown) while enroute during long, overwater, international flights.

The Scott IPC fight navigation tool 104, 105 is a portable device intended to assist pilots in compliance with international flight procedures and navigation for training while also providing in-flight operational guidance to pilots flying international, overseas flights. Once the app is downloaded onto a tablet computer and the tablet computer becomes a flight navigation tool with all components downloaded, an internet connection or IEEE 802.11 digital radio (Wi-Fi) connection is not required to utilize the capabilities of the device. The Scott IPC app contains an International Cockpit Reference Handbook (ICRH) covering areas of operation from around the world to include as a primary focus International Oceanic Operations, the flight navigation tool provides machine readable code for reading the ICRH 132. This information is provided to pilots to obtain critical in-flight and planning guidance to ensure crews have the required information to operate aircraft to ensure compliance with national authorities and the International Civil Aviation Organization (ICAO) requirements. Each country is responsible to establish and publish rules and procedures to operate aircraft in their airspace. These rules are published in each countries Aeronautical Information Publications and is updated on a fixed revision cycle. Oceanic Airspaces beyond 12 NM's off a coastline is recognized by ICAO and all signatory countries to the ICAO convention as international airspace. Although no country owns airspace beyond 12 NM's from their shoreline, ICAO has an agreement with various countries to manage the airspace. The Scott IPC flight navigation tool as configured with the Scott IPC app also includes an ARINC 424 database 134 including ICAO-defined oceanic and domestic routes with associated named reporting points and coordinates of waypoints, international airport locations with frequencies, and NAVAID locations, frequencies, identifiers for all NAVAIDS worldwide. Also depicted boundary information for restricted, alert, and warning areas and other special use airspace at sea. The Scott IPC flight navigation tool also includes a configurable checklist database 136 containing checklists of actions to be performed at various phases of international flight operations.

The Scott IPC flight navigation device also contains a comprehensive Glossary of terms with definitions of issues and items often addressed by pilots flying international trips. The flight navigation device also contains aviation conversions often utilized by pilots flying internationally. These conversions are in a single area in the device and are quickly accessible via the main menu.

The Scott IPC flight navigation device also contains a one of a kind Electronic Plotting Chart Solution known as Scott Plot. This Electronic Plotting Chart is a unique training and operational tool specifically designed to be utilized by aircrews operating aircraft in Oceanic Airspace and is configured to provide a moving-map display of data from the ARINC database 134 together with many other icons and indicators. There is no product on the market with these capabilities available to aircrews outside of this Electronic Plotting Chart.

Pilots are required to perform certain plotting events during the oceanic crossings. The Scott IPC Scott Plot Electronic Plotting Chart provides a means by which pilots may both train and operationally meet the ICAO and the U.S. FAA (Federal Aviation Administration) regulations and follow industry best practice regarding plotting procedures using this electronic plotting chart solution. The Scott IPC Scott Plot sm. Electronic Plotting Chart has features that have never been built in a portable device before. It is a first-in-industry product. Operators have in the past attempted to perform plotting procedures using a graphic of a paper plotting chart on an electronic device. The paper plotting chart converted to a graphic, although suitable to be displayed on an iPad or tablet, has inherent limitations that prevents effective use in day to day operations and certainly in emergency situations resulting from an aircraft navigation system failure. A simple graphic will not allow for plotting or course measurement functions. The Scott IPC Scott Plot sm. Electronic Plotting Chart is a fully functional, independent, standalone navigation tool as well as a feature that performs required and desired auto plotting calculations as described herein.

This Scott IPC flight navigation tool with Scott Plot Electronic Plotting Chart integrated solution contains the following functions, processes, and tools. Each will be discussed in this document: The term ""Unique to this tool"." indicates that this is a first on the market solution that has never been built as part of an electronic standalone tool serving as a Navigation Plotting device.

The Scott IPC navigation tool has a main menu 200 having multiple icons, as illustrated in FIG. 1B. Icons of the top row 202 remain visible regardless of mode, as do icons of the bottom row 220. The space between top row 202 and bottom row 220 is used by individual tools that are activated through the main menu, such as ScottPlot. Each icon is activated by tapping it as it is displayed on a touchscreen of the Scott IPC navigation tool.

tapping the Home (logo) icon 204 routes the user to this Home Screen (FIG. 1B)
  the Sync icon 206 will show sync status and tapping it allows user to sync with another device (FIGS. 40-43)
  tapping the Settings icon 210 will allow user to manage settings
  the GPS icon 212 indicates active/inactive status of the Scott IPC GPS system and tapping it allows users to disable/enable and center GPS.
  tapping the Checklists icon 208 will allow users to set a checklist, and once set, allow users direct access to a chosen checklist for use during flight.
Icons of the bottom row 220 include:
  tapping the Preflight Wizard icon 222 will allow user to access the wizard (FIGS. 69-78) for a step-by-step walkthrough of Preflight app setup.
  tapping Conversions icon 224 will allow user to select and complete needed conversions for flights, including Jet Fuel Weights & Volumes, Climb Rate, Ft/M, Wind Speed, Altimetry, Distance, Temperature, and Weight.
  tapping the Flight Bag icon 226 will allow user to upload or access uploaded PDF documents, including from email, saved documents on iPad, or from the Scott IPC Portal. (See Section 30)
  tapping the ICRH icon 228 allows user access to the proprietary International Cockpit Reference Handbook.
  tapping the ScottPlot icon allows user access to the Electronic Plotting Chart tool which includes the moving map display on which routes, waypoints, NAVAIDs, reporting points, GPS failures, and other features discussed below are displayed; including the ScottPlot toolbox functions.

Tools of the ScottlPC flight navigation tool include, as per section numbers in the flight navigation tool description below:

1. Automatic Oceanic Procedure Reminders based on location and phase of flight "Unique to this tool"
2. GPS functionality with failure and recovery time stamps "Unique to this tool"
3. Provides a means to automatically plot a routing based on an Oceanic Clearance using ARINC 424 named waypoint identifiers "Unique to this tool"
4. Modify routes by entry into a data form, or via drag and drop of waypoints using Snap to Feature "Unique to this tool"
5. Interactive, auto-populating, Navigation System Accuracy Check populated and presented Prior to Coast Out "Unique to this tool"
6. Interactive, Modifiable Checklist "Unique to this tool"
7. Automatically plot a 10-minute check after entry in data block "Unique to this tool"
8. Built in Position Report Form "Unique to this tool"
9. Plot Position
10. Distance Measuring
11. Annotation Tool
12. Automatically or Manually build ETP's "Unique to this tool"
13. Automatically Sync multiple devices, Master/Secondary Feature
14. Provides Full Route Details for checking courses and flying D.R. (Dead Reckoning) courses "Unique to this tool"
15. Automatically plots a wind correction stamp on route of flight. "Unique to this tool"
16. Provides Selectable Layers
  Provides selectable Layers
  a. Layer indicating Airports
  b. Layer indicating NAVAIDS
  c. Layer indicating Waypoints
  d. Layer indicating Fixed Routes
  e. Layer indicating ETP's (Equal Time Points), "Unique to this tool"
  f. Layer indicating Flight Information Regions
  g. Layer indicating Full Route Navigation Details per route leg "Unique to this tool"
  h. Layer indicating controlled airspace
  i. Layer indicating NAT Tracks Westbound
  j. Layer indicating NAT Tracks Eastbound
  k. Layer indicating Pacific Tracks East and Westbound
17. Currently Effective North Atlantic Tracks Layers separated by Direction, "Unique to this tool"
18. Distance for all Route Segments Layer "Unique to this tool"
19. Airports layer
20. NAVAIDS Layer
21. Waypoints Layer
22. Fixed Routes Layer
23. ETPs (Equal Time Points) Layer
24. Flight Information Regions (FIRS) Layer
25. Full Route Navigation Details LAYER "Unique to this tool"
26. Controlled Airspace Layer
27. Layer indicating Pacific Tracks East and Westbound 28. Speed, Distance, Time Calculator design of calculator "Unique to this tool"

29. FREEPLAY/LOFT MODE "Unique to this tool"

30. Flight Bag Upload from ScottIPC portal for use in the flight navigation tool "Unique to this tool"

31. Track Message Upload from ScottIPC backend for use in the flight navigation tool "Unique to this tool"

32. Creates and Manages Journey Logbook "Unique to this tool"

33. Automatically forwards closed out Journey Logbook to clients' portal based on clients' method desired. "Unique to this tool"

34. Emails closed out journey logbook to desired recipients "Unique to this tool"

35. Allows upload of PDF for use in the flight navigation tool "Unique to this tool"

36. Integrates into ScottIPC International Cockpit Reference Handbook (ICRH) "Unique to this tool"

37. Provides User Profile Information

38. Provide user notification of changes to ICRH "Unique to this tool"

39. Allows Flight Department Administrators to assign permissions through the back end "Unique to this tool"

40. Allows permissions to be assigned to individual aircraft "Unique to this tool".

41. Allows users to upload documents to their personal account on the backend and pulls those documents to the flight navigation tool. "Unique to this tool".

42. Restricts access to sensitive documents as assigned by the user or flight department (FD) administrator. "Unique to this tool"

43. Allows user to build a specific plotting chart coverage based on route of flight and oceanic area flown. "Unique to this tool".

44. Automatically downloads relevant operational data and worldwide ARINC 424 database without pilot's intervention Upload process "Unique to this tool"

45. Functions without the need for internet connection

46. Allows pilot control of data usage of the flight navigation tool in flight due to the high cost of in-flight data from sat providers. "Unique to this tool"

47. Indicates unique zoom levels and phased in graticule lines designed for plotting ease. "Unique to this tool"

48. PP DIR TO (Present Position Direct To)

49. Has blue light filter to preserve night vision in the cockpit

50. Separate brightness feature

51. In-flight navigation tool rotate screen lock to accommodate aircraft maneuvering 52. Setting and Adjusting the Plotting Chart Coverage Area "Unique to this tool".

53. NAT RADAR & ADS-B Surveillance Corridor for multiple altitudes "Unique to this tool".

54. Plotting Chart Setup Wizard

55. Toolbox Item Menus "Unique to this tool"

The Scott IPC flight navigation tool has the following features:

1. Oceanic Flight Reminders: "Unique to this tool".

This function assists pilots in execution of best practice and regulatory use of an inflight checklist covering procedures used in a Remote Oceanic Airspace. Flying Oceanic flights can result in a high cockpit workload during certain phases of flight, often resulting in missed procedures which compromise safety. Remote Oceanic Flight is Procedural Airspace, meaning if the correct procedures are not followed, adequate separation from other aircraft is not assured. It is not classified as Surveillance Airspace because Air Traffic Control typically does not have real time position information on the aircraft. The Oceanic Flight Reminders feature automatically provides the pilot with a checklist containing procedures to be followed based on the known location of the aircraft and phase of flight. The reminders function allows the pilot to manage the presentation of assigned tasks to follow, based on the experience level of the cockpit crew as reminders may be enabled or disabled individually. No other resource offered on today's market has this capability. "Unique to this tool".

With reference to FIG. 1, a menu display of Oceanic Reminders for transoceanic flights:

1.1 Users are presented a menu of actionable, oceanic reminders that can be enabled or disabled. This reminder push notification is unique and has never been built before in any portable electronic device.

1.1.2 Setting a reminder to "on" enables a set of push notifications that will provide the user with an actionable, modifiable checklist that contains entries specific to the location and phase of flight the aircrew is currently in.

1.1.3 There are individual selections for each reminder to enable or disable as well as a selection to enable or disable all reminders. All reminders are enabled by default.

1.1.4 An individual notification, once received, can be dismissed by the user.

1.1.5 Each notification pop-up containing an enabled checklist appears regardless of whether the Scott IPC flight navigation tool is actively on the screen.

1.1.6 The automatic presentation of each enabled checklist occurs after takeoff at a predefined time and/or distance from a point requiring an action.

1.1.7 The following notifications are provided as options in Oceanic Flight Reminders:

1.1.7.1 Prior to Coast-Out Enroute to the Outbound Gateway, Approaching Waypoints, After Passing Waypoints, Coasting-In to Landfall. Other reminders include a reminder for a Ten-Minute Position Check, approaching a new Flight Information Region (FIR), Wind Drift Correction Log.

1.1.8 The following triggers will activate an Oceanic Flight Reminder.

1.1.8.1 Prior to Coast-Out (FIG. 22)

1.1.8.1.2 Fifteen minutes prior to the first Oceanic WPT (Waypoint) loaded as part of a route the Prior to Coast Out portion of the oceanic checklist is presented to the pilot.

1.1.8.2 Prior To Passing Waypoint (FIG. 23)

1.1.8.2.1 Two minutes prior to passing every waypoint loaded as part of a route the Prior To Passing Waypoint portion of the checklist will be presented to the pilot.

1.1.8.3 After Passing Waypoint (FIG. 24)

1.1.8.3.1 Two minutes after passing every waypoint loaded as part of a route the After Passing Waypoint portion of the checklist will be presented to the pilot.

1.1.8.4 10 Min Check (FIG. 26)

1.1.8.4.1 Eight minutes after passing every waypoint a popup data entry box will be presented to the pilot so that he or she may enter the position as calculated by the aircraft navigation system. A notification will be received that states 'In 2 minutes perform the 10 Minute Check.' with a provided data entry box for the 10 minute check latitude and longitude entries.

1.1.8.5 Approaching New FIR
  1.1.8.5.1 Ten minutes prior to reaching a Flight Information Region (FIR), a popup notification is received that contains the following; "You are approaching (FIR ID-4chars) FIR. Make appropriate voice contact, and/or ensure the CPDLC Logon hand-off Occurs. Look for advanced notifications".
  1.1.8.5.2 The FIR information is automatically populated into the notification based on the Aircraft current GPS position. The FIR that is displayed will be the FIR ICAO ID that the aircraft is approaching. It is the FIR ID that is on the opposite side of the FIR boundary from the current aircraft position.
  1.1.8.5.3 The pop up appears regardless of whether the Scott IPC flight navigation tool is opened in the foreground.
  1.1.8.5.4 An x closes out the box without action.
  1.1.8.5.5 With GPS failure a popup notification indicating no reminders will function until GPS is regained is presented to the pilot.
  1.1.8.5.6 If GPS is unavailable and a waypoint is passed, when GPS is regained, the popup will reflect the next FIR at 10 minutes prior to reaching that point.
  1.1.8.5.7 If GPS is lost and then regained with less than ten mins to fly to the next FIR, the popup reminder will be delivered with the actual time to go to the FIR
1.1.8.6 Capture Wind Drift Correction (FIG. 48)
  1.1.8.6.1 Halfway between WPT's as calculated by a great circle route distance, a notification will be received that prompts the user to enter wind drift correction (WC) information which will place wind drift correction information on the plotting chart. The Wind Drift Correction stamp will be positioned at the exact GPS position at the time the data is posted. With no GPS signal, the user can position the WC stamp anywhere on the plotting chart. The Wind Drift Correction stamp is used for future Dead Reckoning if needed.
  1.1.8.6.2 User is presented with a custom keypad that has a + and—for wind component.
  1.1.8.6.3 User is presented with an open entry box where the user may enter the wind component.
  1.1.8.6.4 User can select "Post" from the numbers pad, a wind correction (WC) stamp is then posted at the current GPS position.
  1.1.8.6.5 The WC stamp notification will not be presented if GPS is not active. The user may use a WC stamp at any time through the main menu toolbox system
2. GPS Functions, FIGS. 2-7
2.1 When user clicks the GPS icon, a GPS selection menu (FIGS. 5-6) pops up with two options; 'Center GPS Position', 'Disable GPS'.
2.2 The GPS position of the aircraft will always show on the plotting chart when GPS is enabled.
2.3 User will always have a GPS status icon indicator on the top of the screen
2.4 The GPS status icon indicator (FIGS. 2-4) changes from green when enabled and functioning properly, to white with a red circle around it with a diagonal line in the circle when loss of GPS signal has occurred or when GPS has less than 3 satellites to track.
2.5 User will see gray dots indicating the path as read from the GPS, as long as GPS is active with at least 3 satellites in view. The GPS position read from the GPS receiver is displayed as an aircraft icon. No other standalone electronic portable device configured into a flight navigation tool by an app provides this flight path tracking functionality.
2.6 The aircraft icon moves on the plotting chart as the GPS changes position.
2.7 User is presented gray dots for the previous GPS path. One dot populates every 15 seconds. "Unique to this tool".
2.8 With a GPS failure, User is presented with a vertical red line indicator (FIG. 7) on the Plotting Chart displayed at the exact position that the GPS fails or the GPS signal is lost, or less than 3 satellites are in view. The GPS path dots will no longer populate with a GPS fail. "Unique to this tool".
2.9 User is presented with a time stamp indicating the time of loss of GPS and it is positioned near the red line. "Unique to this tool". This allows for an investigation as to where and when GPS failure occurred.
2.10 The GPS position dots will populate again with regained GPS signal, but the previous red line stamp indicating loss of GPS remains on the chart. "Unique to this tool".
2.11 The GPS fail timestamp is labeled in Zulu Time indicating Date, HH:MM:SS Zulu time. "Unique to this tool".
2.12 User will see a green line and a time stamp placed on the plotting chart at the exact position when GPS signal is regained. Time stamp will be Date, HH:MM: SS Zulu time. "Unique to this tool".
2.13 The time stamps are always positioned on the Plotting Chart display so as not to overlap. "Unique to this tool"
2.14 The previous GPS position information is stored to be used for in app calculations needed. "Unique to this tool".
2.15 User can select the GPS ICON menu item to 'CENTER GPS POSITION':
  2.15.1 User has two options to center (the screen) with the GPS position:
  2.15.2 User can select the GPS icon on the top of the Nav Bar to select the CENTER GPS POSITION, which will center the map under the GPS aircraft position.
  2.15.3 User can also center the chart on the GPS aircraft position by selecting the GPS ICON which is always present on the plotting chart.
2.16 User can select the GPS icon at the top of the NAV bar to select 'DISABLE GPS':
3. The Scott IPC flight navigation tool provides a means to automatically plot a routing based on an Oceanic Clearance using an entry form illustrated in FIG. 8, "Unique to this tool".
  3.1 User can select TOOLBOX→Flight Planning→Build/Modify Routes→Autoplot legs, and is presented with a route entry form screen. "Unique to this tool".
  3.2 User can enter a named waypoint directly in the From or named boxes. Using the following formats:
    3.2.1 4850N which is decoded to represent 48° N 050° W.
    3.2.2 H4850 which means N48° 30', 050° W.
    3.2.3 Five letter named waypoint (example: DOTTY), these are looked up in an internal database to determine latitude and longitude 3.2.4 Entered "NAMED" values from the Oceanic Clearance screen will plot on the chart according to the latitude and longitude associated with the NAMED values from the ARINC DB.

3.2.5 Full latitude and longitude in the From field box: N51 degrees 00.0 minutes, W050 degrees 00.0 minutes.

3.3 When the user selects an entry box the keypads are active and the user can enter characters and they automatically fill in, in the order of the placeholders.

3.4 The user can tap the next box, and then populate that box.

3.5 The user can enter a named waypoint, that Lat/Long is automatically shown in the Lat/Long boxes.

3.6 A user can insert a leg, add a leg, delete a leg, clear a leg, delete all legs, or clear all legs.

3.7 The user can select Clear Leg Data to clear a leg allowing the user to re-enter the leg data. This replaces the leg information on the plotting chart once the user selects POST ROUTE.

3.8 When the user clears a leg, the space remains available to re-enter a new waypoint. The route leg can be removed when user taps 'X' next to leg entry box.

3.9 The user can CLEAR ALL LEG DATA and gets a popup stating "CONFIRM CLEAR ALL LEG DATA YES|NO. Selecting yes clears all leg data and, selecting no closes the popup without clearing all leg data. The plotting chart is not changed until Post Route is selected.

3.10 The user can DELETE a WAYPOINT.

3.11 When deleting a waypoint, the user gets a warning popup to confirm the deletion. "Delete Waypoint" "YES NO", (FIG. 9).

3.12 If the user selects yes, the Waypoint is deleted entirely and the gap is closed between waypoints.

3.13 If the user selects NO, then the delete operation is cancelled.

3.14 After a route is built and posted to the plotting chart, the user can open BUILD—MODIFY ROUTES/ AUTO PLOT LEGS at any time and the previously Posted route are populated in the boxes.

3.15 A user can invert the direction of the route in case of an emergency return. "Unique to this tool"

3.16 User can select POST ROUTE to post the route entered on the plotting chart after verification.

4. Build/Modify Routes By Drag and Drop (FIGS. 10 & 11)

4.1 User can select TOOLBOX→Flight Planning→Build-Modify Routes→Modify Route Drag and Drop: "Unique to this tool"

4.2 When a user selects MODIFY ROUTE DRAG & DROP, they are presented with an amber pop up box asking:

4.2.1 "You are about to modify your Oceanic Route, is that what you intended? Yes or No 4.2.2 If a user selects "NO" then they are taken back to the TOOLBOX/BUILD—MODIFY ROUTES menu items.

4.2.3 If a user selects yes, then the legs are unlocked, the pop up goes away and they may move the legs by drag and drop.

4.3 The user is also presented with a pop up box asking what snap to value to use. (FIG. 11).

4.4 The SNAP TO feature allows easy placement of the leg by placing the end exactly to the closest point based on the snap value selected. "Unique to this tool"

4.4.1 SNAP to Whole degree Lat/Long, positions the end to the point of Latitude and longitude to whole degrees.

4.4.2 SNAP to ½ degree snaps the end to the nearest whole degree of longitude and ½ degree latitude.

4.4.3 SNAP to named waypoint snaps to the nearest named waypoint that is not a latitude or longitude name.

4.4.4 No SNAP does not snap.

4.5 User can touch any waypoint on the route, and a magnifying circle appears, showing the waypoint to be modified. The magnifying circle contains a crosshair and magnifies the area of the waypoint to allow user to accurately move the waypoint. The magnifying circle is removed when the user removes finger from screen. "Unique to this tool"

4.6 User sees a popup asking user to confirm modified route, (i.e., "Add N55.0 W40.0 to route? Cancel|Add") "Unique to this tool"

4.7 The user can move any existing route leg by dragging and dropping the intersections or ends to a new location. The route lines will stay connected to the waypoint moved. "Unique to this tool"

4.8 The new location (LAT/LONG or Name) automatically replaces the names in the AUTO PLOT LEGS BOX.

5. Navigation System Accuracy Check (FIGS. 12-18) "Unique to this tool"

5.1 Operating in Performance Based Navigation (RNP) Remote Oceanic Airspace requires that aircraft navigate to a required navigation specification as directed by the International Civil Aviation Organization (ICAO). For aircraft operators to ensure compliance with the navigation standard published for the airspace concerned, the operator must verify the accuracy and proper functioning of the navigation systems installed prior to entering such airspace. The Navigation System Accuracy check allows the operator to perform these performance checks by plotting the aircraft navigation system positions while also allowing the operator to plot and compare the position of the aircraft as derived from a non-aircraft system navigation source (i.e.: ground-based navigation source). The ability to plot multiple aircraft sensors alongside the ground-based positions reduces errors and allows the operator precise validation of own ships navigation sensor accuracy. User can select the Toolbox→Enroute→Prior To Coast Out→Nav System Accuracy Check and User is presented with an entry form box containing multiple options for navigation sensors with associated custom keypads for Navigation System Position Check.

5.2 User can open the Navigation System Position Check box at any time and if entries have already been entered, they will appear in the boxes. (FIG. 12)

5.2.1 User can select any box and then, selecting any character from the keypads, post it in the placeholder.

5.2.2 The keypads are unique in that they only provide those characters that would be needed for the entries considered.

5.2.3 User can select View on chart, and any information entered is displayed on the Plotting Chart.

5.2.4 User can select that this box is to be appended to the 'Journey Log Book' at flight close out (a requirement for international operations when an aircraft is operated more than 12 miles off any coastline).

5.2.5 Each box has a defined max character placeholder capability.

5.2.6 If RAW R/DME data or the FMS R/DME is entered, when "View on Chart" is selected, then the following information is presented on the chart if a NAVAID was entered. If no NAVAID was entered prior to view on chart being selected, then the user gets a popup message informing the user "For the RAW R/DME or FMS R/DME, a NAVAID must be entered."

5.2.6.1 A Radial DME (Distance Measuring Equipment) is a method used in aviation to fix one's position using ground based VHF Omnirange (VOR) Navigation Aids (NAVAID) with co-located DME. The technique requires that an operator tune up a specific NAVAID and gather the magnetic radial from the NAVAID and the Distance as provided in the NAVAID's signal. This procedure is prone to error when the operator plots the position, as it is very difficult to plot a magnetic course to the level of accuracy needed to provide a validation of the accuracy of the aircraft navigation systems using a paper plotting chart. This flight navigation tool process provides a precise level of accuracy for the Radial DME location presented on the electronic plotting chart and location of the NAVAID as read from its internal database, and therefore increases the safety component of the accuracy check. No other flight navigation tool can plot an R/DME and convert it to Latitude and Longitude.

5.2.6.2 The user is presented a RAW R/DME sensor icon w/hide or show, and it is connected to the position entered. The position of the NAVAID is also shown on the Plotting Chart (FIG. 13) as a dot surrounded by a circle.

5.2.6.3 The entered Magnetic Radial is depicted while also converting the Radial and DME distance to a latitude and longitude. The (DME) distance to the NAVAID is also presented on the Plotting Chart.

5.2.6.4 The RAW R/DME information box is connected to a Hide/Show box labeled RAW R/DME position check. This box is connected to the exact latitude and longitude of the Radial DME position fix entered depicted in a Blue circle with a dot. The boxes and icons are Blue. This is significant as an aircraft flight management system always presents raw data in a blue color. This color scheme assists in lessening crew interpretation errors.

5.2.7 User can reposition the position label boxes and the Hide/Show icons, while leaving them connected without affecting the position of the RAW R/DME entered position. User can select hide on the icon, the position information, and the aircraft position circle and dot is hidden. The lines are removed as well. This enables a user to isolate the errored sensors. The Hide or Show icon remains if hide is selected. The NAVAID is in a Blue Circle with a DOT in the center.

5.2.8 FMS RADIAL/DME The FMS R/DME is an Aircraft Navigation System position output that is defined by a Magnetic Radial and a distance from a specific NAVAID.

5.2.9 The FMS R/DME position check function (FIG. 14) is nearly identical to the RAW R/DME method except that the icon and boxes presented on the plotting chart are green. The green color is significant in that calculated aircraft position information is presented in green in an aircraft Flight Management System. This color scheme assists in lessening crew interpretation errors.

5.2.10 FMS1, FMS2, FMS3 (FIG. 15) The FMS1, FMS2, and FMS3 positions are plotted directly as Latitude and Longitude based on the entries of the pilot. The green signifies calculated by the aircraft's Flight Management System information as derived from on board sensors.

5.2.11 IRS1, IRS2, IRS3 see (FIG. 16). The IRS (inertial reference system) position check is identical to the FMS1, FMS2, FMS3 AND THE GPS CHECK except for the color. IRS plots use Magenta to distinguish the sensor type.

5.2.12 GPS (FIG. 17). The GPS Position Check is identical to the IRS or FMS position check except that the color is unique with latitude and longitude entered from a position fix determined by aircraft systems separate from the GPS used by the Scott IPC flight navigation tool. GPS information is purple.

5.2.13 When 'VIEW ON CHART' is selected from the Nav Sys Pos Check Box, a "SENSOR LISTING" dropdown box (FIG. 18) is at the top of the chart. It is always present but defaults to collapsed. All sensor data with positions and lines appear on the chart that were entered for a check. The SENSOR listing allows the user to hide results of any sensor entered. When open, only sensors that were entered show up on the chart or on the Sensor listing.

5.2.14 Each Sensor position and lat/long box with attaching lines can be displayed or not displayed on the chart by selecting the "hide" or "show" box on each individual sensor. The sensor label with show remains when it is in hide mode. When shown it states "hide".

5.2.15 When the SENSOR LISTING dropdown box is used to hide a sensor, the sensor lines, the sensor position and lat/long box is removed but the Sensor I.D. label with hide/show remains.

5.2.16 An individual Sensor I.D. box can be moved to any position on the screen, whether in hide mode or fully shown. When shown, the lines will connect to its position and the now displayed lat/long box.

5.2.17 The default for each sensor within the Sensor Listing is "Show". Also shown when VIEW ON CHART is selected, is a link to return the user to the Navigation System Position Check Box.

6. Interactive Checklist

This Interactive Checklist (FIGS. 19-25) feature is unique to this flight navigation tool. Users may use a stock checklist that is organized by phase of flight and will help users remember to complete all necessary procedures for an international route. This checklist is customizable so that users can adapt the checklist to match their FAA approved or accepted IFOM (International Flight Operations Manual) to remain in compliance with procedures while maintaining a paperless or near paperless cockpit. Users may also create their own checklist from scratch. The Interactive Checklist is one complete checklist, and users can access the checklist from multiple areas of the menu to see the appropriate area for the current phase of flight. The checklist used is interactive. The user can check a box next to an entry to indicate the item is completed. The user can close out the checklist without checking any items, by clicking the x. The user can clear a misplaced check from the checklist if needed. A user can clear all x's from the entire checklist by selecting the "Clear Form" option.

6.1 Flight Planning (FIG. 19)
  6.1.1 User can select Toolbox→Flight Planning→Checklist Tapping this option from the toolbox will take the user directly to the Flight Planning section.
  6.1.2 The Flight Planning Checklist provides the user with an interactive checklist of items that need to be completed prior to entering the aircraft.

6.2 Preflight (FIG. 20)
  6.2.1 User can select Toolbox→Preflight Checklist. Tapping this option from the toolbox will take the user directly to the Preflight section.
  6.2.2 The Preflight Checklist provides the user with an interactive checklist of items that need to be completed preflight.

6.3 Off Blocks Taxi Prior to Takeoff (FIG. 21)
  6.3.1 User can select Toolbox→Off Blocks Prior to Takeoff Checklist. Tapping this option from the toolbox will take the user directly to the Off Blocks section.
  6.3.2 The Off Blocks Prior to Takeoff Checklist provides the user with an interactive checklist of items that need to be completed prior to takeoff.

6.4 Enroute to Outbound Gateway (FIG. 22)
  6.4.1 User can select Toolbox→Enroute→Prior to Coast Out→Checklist. Tapping this option from the toolbox will take the user directly to the Preflight section.
  6.4.2 The Coast Out Checklist provides the user with an interactive checklist of items that need to be completed prior to coasting out over the water.

6.5 Approaching Waypoints (FIG. 23)
  6.5.1 User can select Toolbox→Enroute→Approaching Waypoints→Checklist. Tapping this option from the toolbox will take the user directly to the Approaching Waypoints section.
  6.5.2 The Approaching Checklist provides the user with an interactive checklist of items that need to be completed upon approaching waypoints.

6.6 Enroute After Passing Each Oceanic Waypoint (FIG. 24)
  6.6.1 User can select Toolbox→Enroute→After Passing Waypoints→Checklist. Tapping this option from the toolbox will take the user directly to the After Passing Waypoints section.
  6.6.2 The After Passing Checklist provides the user with an interactive checklist of items that need to be completed after passing waypoints.

6.7 Coast In (FIG. 25)
  6.7.1 User can select Toolbox→Enroute→Coast In→Checklist. Tapping this option from the toolbox will take the user directly to the Coast In section.
  6.7.2 The Coast In Checklist provides the user with an interactive checklist of items that need to be completed upon coast in.

7. Automatically plot a 10-minute check Unique to this app. (FIGS. 26 & 27)
  7.1 User can select TOOLBOX→In-Flight Tools→10 MINUTE CHECK which displays an entry box for Lat/Long that includes the word "PLOT" to activate the entry on the chart. (FIG. 6). A custom numbers pad that contains N, S, E, and W appears prior to 'PLOT' being selected. The format of the latitude and Longitude entry is N55° 22.3' & W155° 22.3'.
  7.2 User can select "Plot" to position the 10-min symbol line that will terminate on the exact location entered. The 10 Min box is 50% transparent.
  7.3 When 'PLOT' is selected, the number pad and Lat/Long entry box goes away and the plotted 10 min check will include a Lat/Long position label with a time stamp. (FIG. 27)

8. Automatically or Manually built Position Report Form (FIGS. 29-31) "Unique to this tool".
  8.1 User can select TOOLBOX→ENROUTE→PASSING EACH WAYPOINT→POSITION REPORT FORM to fill out the report form. Position reports are mandatory for Oceanic Flight Operations. The Position Report Form is populated by the pilot with waypoints used to build an operators route only after receiving an Oceanic Clearance. This information is then passed to ATC. The order of information transmitted in a Position Report is clearly defined by ICAO. This tool and manual entry method ensures that the information can only be entered after gathering the waypoints from the active Flight Management System. This assists the pilots in avoiding a common error in oceanic airspaces—where pilots report flying the flight plan route instead of the route of the clearance received by ATC. A position report is sent after passing every assigned waypoint for a crew's route. The user is presented with a position report form initially with one column, FIG. 29.
  8.2 User can recall the position report form by selecting TOOLBOX→ENROUTE→PASSING EACH WAYPOINT→POSITION REPORT FORM.
  8.3 User can save the form after making the various entries, and then close the form with an X.
  8.4 The report form is appended to the journey log at flight closeout.
  8.5 Displayed Columns will be displayed one at a time. After the first position report is filled out and saved, then the user can add another column by selecting an arrow pointing to the right positioned midway down the columns. Every new column added will have an arrow. Users can add up to 15 columns.
  8.6 Users can edit any box.
  8.7 When user adds a column, the previous column is to the left of the new one added. Items on the Position Report Form (FIG. 29-30) include:
    8.7.1 #1 DATE: MANUALLY ENTERED MM DD YR, SELCAL: MANUALLY ENTERED 4 PLACES,
    8.7.2 #2 Oceanic Control Agency (OCA) I.D. MANUALLY ENTERED, 4 places
    8.7.3 #3 OCA P PRIMARY FREQ MANUALLY ENTERED, up to 5 places, OCA S, SECONDARY FREQ MANUALLY ENTERED, up to 5 places, allows a decimal anywhere.
    8.7.4 #4 AC IDENT: MANUALLY ENTERED 6 PLACES MAX o
    8.7.5 #5 POSITION for the first column: is entered by the pilot. It is the 1st waypoint given in the clearance. It can be overwritten.
    8.7.6 When any new columns are added, the Position for the new column will be populated from the previous column "Estimating Position" entry.
    8.7.7 #6: The TIME HR: MM in Zulu that the aircraft passed the first position waypoint. It is MANUALLY ENTERED, 4 places with: place marker.

8.7.8 #7: FL: MANUALLY ENTERED, 3 places 8.7.9 #8: ESTIMATING POSITION, It is the 2nd waypoint manually entered. Format no restraints. With any new columns added, the "Estimating Position" will be populated from the previous column Next "Pos Only" entry.

8.7.10 #9: AT HR:MM Z, MANUALLY ENTERED, Actual time, 4 places with: place marker. Example 12:35z 8.7.11 #10: NEXT (POS ONLY), manually entered. With added columns the 2nd column "NEXT (POS Only)" will use the 4th waypoint in the oceanic portion of the route.

8.7.12 The 3rd column NEXT (POS Only)" will be the 5th waypoint.

8.7.13 The 4th column NEXT (POS Only)" will be the 6th waypoint.

8.7.14 The 5th column NEXT (POS Only)" will be the 7th waypoint.

8.7.15 The 6th column NEXT (POS Only)" will be the 8th waypoint and so on, with support for up to 15 columns.

8.7.16 #11: TEMP (SAT), MANUALLY ENTERED default– (negative symbol) placeholder, then 2 characters.

8.7.17 #12: WIND, MANUALLY ENTERED _____ placeholder/_____, 6 places with/

8.7.18 #13: TURBULENCE: MANUALLY ENTERED, I place with labels N=Nil, L=Light, M=Moderate S=Severe 8.7.19 #14: ICING, MANUALLY ENTERED, I place, with labels N=Nil, L=Light, M=Moderate, S=Severe 8.7.20 #15: MID WX. OAT: MANUALLY ENTERED—placeholder and 2 places, 8.7.21 #16 WIND: MANUALLY ENTERED _____/_____ 6 places, 8.7.22 #17: POS AT: MANUALLY ENTERED, 3 places.

8.7.23 #18: ALTIMETERS—#1 MANUALLY ENTERED 3 PLACES, #2 MANUALLY ENTERED 3 PLACES, Stby, MANUALLY ENTERED 3 PLACES.

8.7.24 #19: TIME SENT, MANUALLY ENTERED, HR:MM z actual time example 12:35z 8.7.25 #20:10 MIN CHECK, YES OR NO, MANUALLY ENTERED check boxes.

8.7.26 User Can select plus symbol and add another column 8.7.27 Position report forms are automatically saved so data will be present when it is opened again.

8.7.28 The Position Report Form has a custom keypad (FIG. 30) and a custom keypad for entry of latitude and longitude (FIG. 31), both for touchscreen data entry.

9. Plot Position (FIG. 31)

9.1 User can select TOOLBOX→IN-FLIGHT TOOLS→PLOT POSITION and will have 2 sub-menu items:

9.1.1 'AUTO PLOT BY GPS', Unique to this app.

9.1.2 'PLOT POS BY LAT/LONG"

9.2 When Auto Plot BY GPS is selected the current GPS position is plotted on the chart via a box that has an arrow pointing directly to the spot on the leg. It also has a timestamp in UTC.

9.3 When PLOT POS BY LAT/LONG is selected the user can enter their lat/long coordinates into the custom unique keypad input boxes to plot their current position. The numbers keypad contains N, S, E, and W selections for quick entry of Lat/Longs. See FIG. X 30.

10. Distance Measuring tool (FIG. 32)

10.1 User can select TOOLBOX→IN-FLIGHT TOOLS→DISTANCE TOOL and will be presented with a line about 2 inches long with a box (white fill, black text) in the center and on top of the line that represents the distance.

10.2 User can relocate either end of the line to any position on the plotting chart. As the line is adjusted, the distance appears in the box centered over the line. It is always the Great Circle Distance.

10.3 User can tap the x and the distance line and its value is removed.

11. Annotation tool:

11.1 User can select ANNOTATION TOOLS icon represented by a pencil and is presented with a custom set of annotation tools. (FIG. 33).

11.2 User can bring up a set of annotation tools that include: pencil and a highlighter with ability to change colors (5 options for color), a text box label, and eraser to erase marks or text box labels.

11.3 User can adjust the size of a text box and position it anywhere.

11.4 User can move and size the textbox.

11.5 User can edit or delete any text box after it is built.

11.6 User can select eraser and use the eraser on a text entry or any other annotation.

11.7 User can use an 'undo' and 'redo' feature

12. Automatically or Manually build ETP's (Equal Time Points) (FIGS. 34-38b) "Unique to this tool"

12.1 User can select TOOLBOX→FLIGHT PLANNING→ETPs (Equal Time Points) or TOOLBOX→IN-FLIGHT TOOLS→ETP's and will have 2 sub-menu items, 'BY LAT/LONG', or 'AUTO BUILD.

12.1.1 An ETP (Equal Time Point) (FIG. 34) is a tool used on Oceanic Flights to identify that point along a route where it is the same time to fly to get to two alternate airports. This tool is required because it lets the pilot know the quickest way to get on the ground from anywhere along the route. An operator may have one, two or more ETP's along his route of flight. A single ETP would be appropriate if there was an alternate airport behind him and one in front of him. For example, if the aircraft had not reached the ETP on his route of flight, given an emergency that required a diversion, the fastest way to get on the ground may be to turn around or return. At the ETP it takes the same time to fly to both alternate airports, the one behind and in front. So naturally if the ETP is passed then the pilot knows it is quicker to continue to the forward or what is referred to as the continue alternative. The capability to develop an ETP is a critical skill needed for overseas oceanic flight operations. The United States FAA's guidance in the Flight Standards Information Management Guidance FSIM 8900.1 given to their inspectors addresses overwater operations with regards to sophisticated navigation systems in modern aircraft while highlighting the need for extensive operational drills and training. In Vol 4 Chapter 12, 4-1289, G Training Curriculum Content it states "Experience has clearly demonstrated that the presence of sophisticated navigational equipment on board an aircraft does not, by itself, ensure that the flightcrew will achieve a high level of safety performance. The rapid growth in traffic density and the complexity of CNS requirements in the SAOs makes it essential that operators provide adequate training for the personnel operating or maintaining the equipment. Inspectors must be proficient in using test equipment when returning navigation equipment back to operable service. Operating drills and procedures by flight-crew should also be included as required by ICAO Doc. 7030, Regional Supplementary Procedures. Questions concerning the acceptability of training should be referred to the regional NextGen SAO Specialist, formerly known as Navigation Specialist. Inspectors should strongly recommend that the crew qualifications include, at a minimum, the subjects listed below:" In this list is a direct reference to the use of plotting charts and ETP's. "Preparation of ICAO flight plans, plotting charts, and flight logs to include equal time point (ETP) calculations;"

12.1.2 The Scott IPC Electronic Plotting Chart serves all the purposes cited above. The auto and manual calculation of ETP's is a critical skill used by pilots flying over water. The Scott IPC Electronic Plotting Chart feature, both trains and simplifies the process to build ETP's more accurately than can be accomplished with paper, pencil and slide rule. The Scott IPC flight navigation tool is the first flight navigation tool to configure a portable electronic device to perform the building of and use of a plotting chart and ETP's.

12.1.3 The objective of an ETP is to calculate a time to fly, which can be converted to a known amount of fuel needed, which lets the pilot know if he has what is called a wet footprint. A wet footprint is when an aircraft has insufficient fuel to reach an alternate airport from anywhere along his route of flight. U.S. Federal Aviation regulations as well as ICAO regulations strictly forbid a commercial operator from operating with a wet footprint. Pilots must evaluate the fuel needs of any given route to ensure compliance with these and other ICAO regulations and ETPs are critical to that evaluation. In some cases, the route of flight lends itself to the use of two ETPs along a route. (FIG. 35) An example of this type of route is found in the North Atlantic as well as other airspaces. Take the case of an aircraft flying from Gander Newfoundland to Shannon Ireland Eastbound. In this case a pilot could use two ETPs for the route. Slightly beyond the halfway point to the north is Iceland. So, an aircraft would build the first ETP that would be positioned between Gander (the return airport alternate) and an airport alternate in Iceland (the continue off route airport alternate). The next ETP would be built using Iceland as the return and Shannon Ireland as the continue. Every ETP built has a return and continue alternate. So, by using two ETP's along a route it lessens the time to fly to get to a suitable alternate. Imagine one ETP midway between Gander Newfoundland and Shannon Ireland. It would be perhaps a 2-hour flight to return or continue to one of the airports from the middle of the North Atlantic. But by placing another option like Iceland for both the first half of the flight and the second half of the flight the time to fly to either alternate is significantly reduced.

12.1.4 The Scott IPC Plotting Chart ETP functions allow both of these scenarios to be utilized with ease and accuracy reducing error and time in jeopardy given an emergency flight to an alternate airport.

12.1.5 Often there are times when a planned alternate cannot be used due to various weather conditions, but the disqualification of the alternate occurs after the flight is on its way. Pilots must be able to calculate ETPs in-flight. This has been done in the past using a paper plotting chart, a good bit of practice, a slide rule and a lot of estimates. The Scott IPC Plotting Chart ETP build eliminates all these problems. Operators can autoplot established ETP's by entering in the previously calculated ETP locations. The operator can also build ETP's using the pilot's inputted data. Or, the pilot can use the annotation pencil tool and plot the position of the ETP's with a simple annotation on the route of flight.

12.2 When user selects ETPs by LAT/LONG the user is presented with an ETP entry box and custom keypads. The numbers keypad contains the letters N, S, E, and W for quick entry of latitude and longitude (Lat/Long). (FIG. 36, 38a).

12.3 The lat/long entered by a user would be a lat/long position on the route. For this requirement there is NO calculation of an ETP being performed, it is simply plotted. This function also allows labels to be applied to the ETPs.

12.3.1 Step 1 . . . User selects ETPs by LAT/LONG and enters ETP Lat/Long in the ETP entry boxes. The User enters the Return and continue alternate and enters the label for the ETP he is entering. (FIG. 36) After entering all the ETP's the user selects plot. The ETP is plotted on the chart with arrows pointing to each alternate (Return and Continue as appropriate). The label box contains the information that was entered for the ETP label.

12.4 AUTOBUILD NEW ETPs 12.4.1 AUTOBUILD NEW ETPs automates the ETP build process for the pilot. It will accurately build and plot each ETP on the plotting chart based on data entered by the pilot. This is "Unique to this tool"

12.4.2 Step 1 . . . When the user selects TOOL-BOX→IN-FLIGHT TOOLS→ETPs→AUTO BUILD, the user is presented with a data entry box containing: Return Airport, Continue Airport and an ETP Label field. The fields will populate a write ahead suggestion for the alternates that contains the full Latitude and Longitude for the airfield to ensure the user selects the correct airport since there may be airports with a similar name. After filling in each field the user continues by selecting "Next". (FIG. 37)

12.4.3 Step 2 . . . the machine now calculates the equal distance point between the previously entered alternates along the route of flight previously built. The user sees a triangle that touches the route of flight. This serves as a confirmation of the alternates he selected to build the ETP. The user is presented with instructions to enter wind direction and wind speed with the average True Airspeed (TAS) at the arrowheads presented on the triangle presented. Figure X The user enters this information as derived from the upper level wind chart or the computerized flight plan used for the flight. Once those elements have been entered the user enters a label and any information desired for the label of the ETP. When all is entered the Post ETP link is selected.

12.4.4 ETP Processed: The machine then processes the information using average wind direction to each alternate, average wind speed in knots, and average aircraft True airspeed as entered by the pilot. The machine then plots the newly built ETP on the plotting chart showing two arrows pointed at the alternates entered and showing the label as entered by the pilot. The exact ETP is displayed as a line bisecting the route of flight. (FIG. 38*a*)

12.4.5 When the user selects POST, the user is also asked if they would like to build another ETP. If yes, then the process repeats. If no, then they are viewing the plotting chart with any ETP's built.

13. Automatically Sync multiple devices, Master/Secondary Feature "Unique to this tool". FIGS. 39, 44*a*, 44*b* Block diagram of Sync Process 13.1 Background for the Master/secondary Sync feature. The United States FAA has published a requirement that only one Master Document is allowed on the flight deck at a time. A Master Document is really multiple documents comprising a computerized flight plan and a plotting chart. The reason for the rule is that checks and balances are annotated on the computerized flight plan and the plotting chart during the flight and important decisions are made due to these entries. It is undesirable to have inconsistent and conflicting information presented to the aircrew during a flight, so this rule prevents operators from having different information in front of them. With a paper computerized flight plan and plotting chart, the documents are literally handed back and forth on a clipboard. The Scott IPC Plotting Chart tool accomplishes the same requirement by means of Bluetooth syncing of devices.

13.2 Both iPads can make annotations or changes to the flight plan, plotting chart, or journey logbook entries when 2 iPads are synced. The portable electronic devices configured using the Scott IPC plotting chart sync tool will always have matching data. When one device makes a change, it is synced to the other device. Each device will be assigned a role. Either Master or Secondary. The device selected as Master will be the official version and will therefore be captured after the flight to be used in the Journey Logbook upon Flight Closeout.

13.3 The Scott IPC Plotting Chart tool utilizes a short-range radio such as Bluetooth (provided on the iPad) to allow for synchronization between 2 iPads for the flight plan, plotting chart, Annotations, Position Report Form or journey logbook information when changed or entered from either iPad.

13.4 Only two iPads can be synchronized in the cockpit.

13.5 User can select SYNC DEVICES ICON from the top navbar and be presented with a sub-menu asking the user to Select the role for the device: MASTER or SECONDARY.

13.5.1 When user selects "MASTER", any other iPads that have selected the SYNC ICON and are available as a SECONDARY device will show up and the MASTER device user will select the iPad to which they wish to connect.

13.5.2 When user taps 'SECONDARY' they will see a popover "Waiting for connection" message until the MASTER device selects the SECONDARY device that made the request, which will complete the connection.

13.5.3 After SYNC is accomplished, user will see icons on the top navbar for the selected role for the device. Either Master or Secondary, or not synced. (FIG. 45)

13.5.4 User will have status information always present on the top icon bar of the flight navigation tool. It automatically displays the correct sync status of the device.

13.6 If devices are synced, the user will be able to select Sync Icon→DISCONNECT DEVICES and this will disconnect the devices. If Sync is disconnected, the previous Master device will be indicated as such. Master device will see a top navbar icon that says, "Previous Master" (FIG. 42) and Secondary device will see a top navbar icon that states "Not Synced" (FIG. 43).

13.6.1 Tapping on any Sync icon will allow users to begin the sync process again. Either iPad will be able to take over the Master role, and information will pre-populate from the previous Master and then remain in memory with the new Master device.

14. Full Route Navigation Details (FIGS. 45-47)

14.1 User can bring up the full route details for every route built, two ways: Via a layer or via The TOOL-BOX→IN-FLIGHT TOOLS→FULL ROUTE DETAILS.

14.2 When GPS is active, Full Route Details shows Ground Speed (GS), Estimated Time Enroute (ETE), Estimated Time of Arrival (ETA) and leg distance to go [in nautical miles (nm)] at the top of the chart. Full Route Details can be accessed via the Red Tool Box or the map Layers menu. The Initial Magnetic and True courses are displayed in a blue box connected to the start of each leg. An icon representing the aircraft position and direction is shown on the route line. At the start of the next leg there is a Blue Box with the word NEXT, and this box contains the Initial Magnetic and True Course for the Next leg. (FIG. 45).

14.3 When GPS fails, Dead Reckoning (D.R.) mode automatically displays with instructions appearing on the bottom of the screen. The Scott IPC navigation tool includes machine readable code for providing pilots with a heading and timing for a rhumb-line route from a location where the GPS fails to the next waypoint of the currently planned route, this D.R. mode is based on winds aloft, TAS, and the last known GPS position as well as waypoints stored in the trip database by the pilot when the pilot configured the current route. The instructions are as follows:

14.3.1 GPS has failed . . . Until you enter winds and TAS, the last GPS GS prior to GPS fail will be used for the ETE, ETA and distance remaining.

If continuing along your route:

Fly the Average course shown in the center of the D.R. leg ensuring you apply last known wind drift correction until ETA to the next waypoint.

If continuing along your route and need to compute winds correction:

Enter estimated wind direction, speed and estimated TAS

The estimated GS, ETE, ETA and distance is now calculated based on these entered values.

Fly the Average D.R. Headings shown in the center of the D.R. leg until reaching the ETA.

If deviating from your cleared route:

Position the starting and ending point of the intended D.R. path.

Enter estimated wind and TAS for the D.R. path you need. The Est GS, ETE, ETA and distance is now calculated based on these entered values.

Fly the Average D.R. Headings shown in the center of the D.R. leg, until the ETA.

Approaching next Leg

Re-position start and end point of the D.R. Leg.

Re-evaluate Winds and TAS, if needed.

Fly the average D.R. Headings shown until the ETA for the new leg.

14.3.2 These instructions can be closed (X) and then reopened by the user if desired via a Question Mark (?) button.

14.4 The aircraft's position at the time of GPS failure is now shown as a red chevron with a circle around it and has an adjustable drag feature. From the GPS failure point extended to the next waypoint is a red dashed line that follows a rhumb line routing to the next waypoint. This rhumb line route represents the average course to the next waypoint from the point of GPS failure. The GPS icon in the top nav header will also show a failure. GS, ETE, ETA and Distance are now displayed in amber. "EST" for estimated is now shown with ground speed and distance. A box containing empty values is directly below the ETE at the top of the page. This box is labeled Dead Reckoning Mode Active and contains a Wind and TAS field that the user could fill in. Until the user enters wind and TAS, the last GPS derived GS will be used to calculate the ETE, GS, ETA and Distance remaining. The box connected to the Rhumb line route will reflect the average courses Magnetic and true (not wind corrected) from the point of failure and the next waypoint.

14.5 Once the user enters Wind and TAS in the provided entry boxes, a box connected to the Rhumb line route presents Average Magnetic and True Headings as the winds are now applied to the course calculations converting them to Headings. (FIG. 46)

14.6 When GPS is regained, When the GPS signal returns, the GPS icon will return to an active state and the point where the GPS became active is now displayed on the route line along with an aircraft icon. The initial courses both mag and True as well as the next waypoint initial mag and true course will be shown. The time stamp where GPS failed will still be present and a timestamp where GPS was regained will now be placed along the route where the GPS signal was regained. (FIG. 47)

15. Automatically plots a wind correction stamp on route of flight "Unique to this tool"

15.1 User can select TOOLBOX→IN-FLIGHT TOOLS→WIND CORR STAMP and a WIND CORR entry box appears so that the user can enter wind drift correction. (FIG. 48)

15.2 Wind Correction during Dead Reckoning Navigation is a key component of flying accurate headings to arrive at a specific point. The Wind Correction Stamp allows an operator to capture a wind Component in case of the need to D.R. either forward or to reverse course and fly a return route accurately. Although the computerized flight plan has the average wind component for each leg depicted, it is only a forecast product and does not indicate drift correction due to winds. The Wind Correction Stamp used in this flight navigation tool allows for real time data input of the actual wind correction component to be captured.

15.3 User is presented with a customized entry keypad with numerals 1 thru 9 and a zero. There is also a + and −sign as wind correction is either a plus or minus component. The entry box accepts a minus or plus sign and 2 numbers.

15.4 User enters the WC into the entry box and selects Post, the WC is then plotted on the route of flight with a line that bisects the exact position at the time of entry. The WC stamp can be used anytime and displays WC with the correction component. e.g. 'WC+02

16. Provides Selectable Layers (FIG. 49)

16.1 User can select LAYERS icon and is provided a menu of all layers available:

Layer indicating Airports

Layer indicating NAVAIDS

Layer indicating Waypoints

Layer indicating Fixed Routes

Layer indicating ETP's (Equal Time Points), "Unique to this tool"

Layer indicating Flight Information Regions

Layer indicating Full Route Navigation Details per route leg "Unique to this tool"

Layer indicating controlled airspace

Layer indicating NAT Tracks Westbound

Layer indicating NAT Tracks Eastbound

Layer indicating Pacific Tracks East and Westbound

Auto Distance layer 16.2 User can see as many layers as they select to overlay on the PC by selecting on or off on slider button.

16.3 Each layer will become visible at predetermined zoom levels after being selected for enable.

17. Currently Effective North Atlantic Tracks Layers separated by Direction, "Unique to this tool"

17.1 User can select LAYERS icon→NAT-OTS→Eastbound and/or Westbound. and will be presented with the tracks plotted on the plotting chart. Each waypoint that defines the track is displayed.

17.2 When the flight navigation tool is opened with Wi-Fi coverage, the current full NAT Track message is uploaded automatically and placed in the misc doc folder as a PDF.

17.3 The Scott IPC backend portal will check for a change of track message every 5 minutes and deliver the new track message when it identifies a new message.

17.4 Each track on the plotting chart is labeled with the track Direction and identifier. Example West A or East Z.

17.5 Each waypoint that makes up the full track is identified on the plotting chart with the track route.

17.6 User can view the printed Track message applicable for the track valid period by selecting the Track message ICON (FIG. 50) in the bottom left of the plotting chart, which is always present if the NAT Track Layer is active.

17.8 An x closes out the full track message but leaves the track layer and icon in place until the user selects disable from the layer menu.

17.9 The Track Message Layer is not depicted on the Plotting Chart unless the layer is enabled and the zoom level reaches a prescribed zoom level.

18. Distance for all Route Segments Layer (FIG. 51) "Unique to this tool"
   18.1 User can select the Layers ICON AUTO DISTANCE LAYER and the distance for all legs built will present in the center of all routes.
   18.2 The Manual Distance Measurement Tool allows an operator to calculate Distance. See section 10 for discussion.
19. Airports Layer
   19.1 User can select LAYERS icon→AIRPORTS Enabled and airports with ICAO I.D. labels will be displayed.
   19.2 User can select an airport I.D. and derive detailed airport information such as runways available, lengths of runways and full name
20. NAVAIDS Layer
   20.1 User can select LAYERS icon→NAVAIDS and the Navaids layer will be depicted.
   20.2 User can select Navaid once it is depicted and derive detailed Navaid information.
21. Waypoints Layer
   21.1 User can select LAYERS icon→WAYPOINTS and the Waypoint layer will be depicted containing all worldwide waypoints.
22. Fixed Routes Layer
   22.1 User can select LAYERS icon→FIXED ROUTES and the Fixed Route layer will be depicted.
   22.2 Fixed Routes are routes published by airspace authorities for the airspace concerned.
   22.3 FIXED ROUTES Layer is depicted for worldwide routes
23. ETPs (Equal Time Points) Layer see section 12 for ETP descriptions "Unique to this tool".
   23.1 User can select LAYERS icon→ETPs WITH LABELS and the ETPs with labels layer will be depicted.
24. Flight Information Regions (FIRS) Layer
   24.1 User can select LAYERS icon→FIRs and the FIRs with labels layer will be depicted.
   24.2 Any FIR globally will be depicted with its ICAO I.D. and full Name.
   24.3 Any previously built ETP for the flight in force will be depicted.
25. Full Route Navigation Details LAYER
   25.1 User can select this layer from LAYERS icon→FULL ROUTE DETAILS or select TOOL-BOX→IN-FLIGHT TOOLS→FULL ROUTE DETAILS.
26. Controlled Airspace Layer
   26.1 The Controlled Airspace Layer depicts all Controlled airspaces in the world.
   26.2 All Controlled airspace boundaries are labeled.
   26.3 All Military and warning areas are depicted and named with this layer.
   26.4 The controlled airspace layer also depicts all Special use airspace wherein an approval is required to operate within. This airspace is known as SAO airspace.
27. Layer indicating Pacific Tracks East and Westbound
   27.1 The Pacific Tracks Layer depicts daily published Pacific Tracks between the U.S. and Asia.
28. Speed, Distance, Time Calculator design of calculator "Unique to this tool".
   28.1 User can select this calculator from TOOL-BOX→IN-FLIGHT TOOLS→SPEED-DISTANCE-TIME CALC and is presented with a Speed, Distance, and Time Calculator (FIG. 52)
   28.2 The user is then provided entry boxes and a custom numbers keypad that contains 1 thru 9 and 0.
   28.3 The user enters the values required for the calculations and the calculation is carried out.
   28.4 User can enter a number value by selection of an input box. Two of the input boxes need to have data entered by the user and then the result is automatically displayed in the third box. The values are Distance in nautical miles (NM (FIG. 52), Speed in Knots, and Time in minutes. The 60 is a constant.
   28.5 Input values are in positive whole numbers. A character limit is imposed for the values entered as follows: Distance—4, Speed—3, Time—3.
   28.6 The calculated time result is in minutes with precision up to 1 decimal place. The number of output digits in the result calculation can exceed the maximum values allowed when user inputs the maximum values, therefore the calculated output for Distance (nm) and Speed (knots) will provide 6 digits and the calculated output for Time (min) will allow for 7 digits including one decimal point for precision.
   28.7 User can close out the SDT calculator when finished.
29. FREEPLAY/LOFT MODE (FIGS. 53-54) "Unique to this tool"
   29.1 As addressed earlier in this document, operators are required to include training exercises and drills within their flight operations. The presence of sophisticated aircraft navigation systems does not by itself result in error free operations. It is to that end that the FREE PLAY/LOFT MODE mode is contained in this Scott IPC. Scott Plot. Electronic Plotting Chart feature of the flight navigation tool. The user can enter into a Freeplay mode that allows the user to completely simulate Oceanic Operations. Once the app is installed in an iPAD or suitable portable electronic device, that device becomes a flight navigation tool suitable for use for simulator training and in aircraft operations. The operator can directly control the speed and the direction of the aircraft to simulate an aircraft in flight over a planned route on the plotting chart. The flight navigation tool will simultaneously allow the user to utilize the various supported functions from the toolbox and layers during the aircraft simulated flight. This will allow the user to enter a 'training mode' and use the plotting chart application in preparation for how the flight navigation tool would be used in an actual flight. Practicing FAA company approved procedures and practices.
   29.2 User will enter 'Freeplay Mode' by selecting TOOL-BOX→Training→Freeplay Mode.
   29.3 When Freeplay Mode is initiated, the GPS function is disabled.
   29.4 While in Freeplay Mode, the GPS satellite icon will change to a yellow GPS icon with a red circle and line through the icon to indicate GPS is disabled. All Plotting Chart functions that depend on GPS use the information on speed and direction inputted by the user.
   29.5 An overlay at top of the PC will always be displayed in Freeplay Mode and state, 'You are now in Freeplay Mode. GPS is inactive'. (FIG. 53)
   29.6 If user attempts to use toolbox to enable GPS, a popup to the user is presented:
   'You must exit Freeplay Mode to enable GPS.' User can CONFIRM or CANCEL.
   29.7 User will have the following controls and icons when in Freeplay Mode. (FIG. 54)

29.7.1 User is provided a simulated yoke for directional control (Ball flag FIG. 53X), and a speed setting slider (Ball flag 2 FIG. 53X) in the bottom center of the screen. The speed is always shown above the center of the speed slider.

29.7.2 User is provided a red chevron icon that represents the aircraft (Ball flag 3 FIG. 53x) position and direction, slightly above the yoke.

29.7.3 The user is presented a Start/Pause Freeplay Button that changes state as it is selected.

29.7.4 The user is presented an Exit Freeplay button to end Freeplay mode.

29.8 User manipulates the yoke icon to change direction of the simulated flight of the aircraft.

29.8.1 User touches and holds their finger on right or left handle of yoke and can rotate the yoke a maximum of 45 degrees right or left to change flight direction. As the yoke is rotated the number of degrees it is rotated determine the turn rate of the aircraft chevron. When the yoke is rotated clockwise the aircraft will turn to the right. When the yoke is rotated counterclockwise, the aircraft chevron will turn to the left. When user removes their finger from the handle the yoke will automatically return to the center position. The aircraft chevron will continue to turn as long as the yoke is held in a turn position 29.8.2 The yoke is active whether the Freeplay Mode is in active or pause mode. The yoke is also active before Freeplay Mode is started.

29.8.3 The amount of rotation in the yoke slows or speeds up the turn of the aircraft. The rate of turn for the aircraft chevron is determined as follows:

29.8.3.1 When the yoke is rotated 10 degrees, the aircraft chevron rotates at a rate of 2 degrees per second. If the user held the yoke at 10 degrees, the arrow would continue to turn at that rate.

29.8.3.2 When the yoke is rotated 15 degrees, the arrow rotates at a rate of 3 degrees per second. If the user held the yoke at 15 degrees, the arrow would continue to turn at that rate.

29.8.3.3 When the yoke is rotated 20 degrees, the arrow rotates at a rate of 4 degrees per second. If the user held the yoke at 20 degrees, the arrow would continue to turn at that rate.

29.8.3.4 When the yoke is rotated 25 degrees, the arrow rotates at a rate of 5 degrees per second. If the user held the yoke at 25 degrees, the arrow would continue to turn at that rate.

29.8.3.5 When the yoke is rotated 30 degrees, the arrow rotates at a rate of 6 degrees per second. If the user held the yoke at 30 degrees, the arrow would continue to turn at that rate.

29.8.3.6 When the yoke is rotated 35 degrees, the arrow rotates at a rate of 7 degrees per second. If the user held the yoke at 35 degrees, the arrow would continue to turn at that rate.

29.8.3.7 When the yoke is rotated 40 degrees, the arrow rotates at a rate of 8 degrees per second. If the user held the yoke at 40 degrees, the arrow would continue to turn at that rate.

29.8.3.8 When the yoke is rotated 45 degrees, the arrow rotates at a rate of 9 degrees per second. If the user held the yoke at 10 degrees, the arrow would continue to turn at that rate.

29.9 The point of the red chevron represents the direction of the simulated aircraft. The yoke can be used prior to starting the flight to set the initial flight path direction.

29.10 User can manipulate a speed slider icon to increase and decrease the speed of aircraft. The user can press and move the vertical bar within the speed slider to set the speed to the desired setting. As the speed slider is being changed the current speed displayed above the bar is displayed. When the user releases their finger, the speed is set to that value. The range represented on the speed slider is from 400 kts to 4000 kts. The default speed is 450 kts. The speed slider setting can be manipulated prior to the Freeplay flight, when the flight is paused or during a flight.

29.11 Order of Operation for Freeplay Mode 29.11.1 Prior to starting Freeplay Mode, the user selects the aircraft chevron and a handle appears connected to the aircraft chevron.

29.11.2 The user positions the aircraft chevron to the desired start point and taps off the chevron.

29.11.3 The user then sets the desired speed.

29.11.4 After the speed is set, the user sets the required Oceanic reminders from the TOOLBOX I IN-FLIGHT TOOLS/OCEANIC FLIGHT REMINDERS menu.

29.11.5 The user selects Start Freeplay Mode.

29.12 After Freeplay Mode has been started and Freeplay is active, the ability to move the aircraft chevron icon is disabled. If the user pauses the flight the aircraft icon can then be moved to anywhere on the PC.

29.13 When flight is paused the user can tap the aircraft chevron and use the handle to relocate the aircraft chevron.

29.14 The path of the flight is depicted on the Plotting Chart with red dot(s) at a 30 second frequency (same as when GPS is being utilized, except dots are red in freeplay mode not gray as in normal mode).

29.15 When user presses pause the flight path will be paused. The flight path of the aircraft chevron is still depicted. If the aircraft chevron is relocated, the flight path dots are removed and will begin to re-populate when flight is resumed and pause is no longer evoked.

29.16 While in pause mode, all functions in the toolbox operate normally except for GPS.

29.17 When paused the aircraft chevron can be turned.

29.18 In flight the aircraft chevron can be turned.

29.19 If there have been any annotations made on the Plotting Chart while paused, after the user taps the aircraft chevron a popup message appears asking the user: "Do you wish to clear added annotations made during Freeplay Mode before moving the aircraft?". If they answer no, then annotations remain on the Plotting Chart, if they answer yes, then the annotations added during Freeplay Mode are cleared from the Plotting Chart. This includes ETP's. However, this does not clear or reset the Plotting Chart area or any route previously built.

29.20 If user exits Freeplay Mode then all controls and aircraft path are cleared. However, this does not reset the Plotting Chart area and the Plotting Chart as set prior remains.

29.21 The user can exit Freeplay Mode to initiate a new flight.

29.22 If the user zoom's in and out of the Plotting Chart while in Freeplay Mode the yoke and speed slider will not change in size.

29.23 If the user selects to open the ICRH manual or any other hamburger menu item while freeplay mode is active, the travel of the Freeplay aircraft pauses automatically. When the user returns to back to freeplay, all previously built annotations and flight path remains. The user must press 'start Freeplay' again to restart aircraft motion.

30. Flight Bag Upload from ScottIPC portal for use in flight navigation tool "Unique to this tool".
   30.1 Scott IPC has created and maintains an online web portal for Flight Department administrators, Flight Department pilot, and contract pilot use. Login is required to access/use the portal. It works in conjunction with the Scott IPC iOS flight navigation tool.
   30.2 Flight Department admins/pilots and contract pilots can upload, store, and assign documents for use on the flight navigation tool.
      30.2.1 Documents that can be stored/assigned for use can include flight plans, manuals, and miscellaneous documents in PDF form.
      30.2.2 Once a flight plan is uploaded to the portal, assigned users can upload the flight plan from the portal while using the iOS flight navigation tool.
   30.3 Users are also able to upload a flight plan into the Scott IPC iOS flight navigation tool directly from the flight navigation tool via email or from stored documents on iPad.
   30.4 Flight Department admins or Contract Pilots can block any use of the document portal by selecting 'Restricted' on a pilot account so that sensitive flight information stays locally on the iPad. This would pertain to flights/flight planning that is sensitive in nature due to passengers.
31. Track Message Upload from ScottIPC backend for use in flight navigation tool "Unique to this tool".
   31.1 The Scott Plot sm. Electronic Plotting Chart sm. is configured to receive information from the database that is parsed from the NAT Track Message on the FAA website. This information will be retrieved every 5 minutes from the FAA website, parsed and available to users to provide them with the most up-to-date track message information from the FAA website.
32. Creates and Manages Journey Logbook (FIG. 55) "Unique to this tool".

Any aircraft operating more than 12 NM's off any coastline in the world is operating in ICAO International Airspace. The United States of America is a signatory of the Chicago Convention and therefore obligated to follow ICAO published annexes and standards (SARPS) within when publishing U.S. regulations. If a U.S. Regulation does not comply with a standard that is published by ICAO, then the U.S. is obligated to publish differences to the ICAO published standards. There are no U.S. published differences to the ICAO Journey Logbook requirement. Operations conducted in oceanic airspace more than 12NM's offshore are not regulated by the U.S. but rather the world body namely ICAO. It is an ICAO requirement that any aircraft operating more than 12NM's off any coast maintain a Journey Logbook. ICAO Annex 2 Operation of Aircraft dictates this requirement. The Scott Plot sm. Electronic Plotting Chart sm. flight navigation tool provides the only electronic automatic mechanism to comply with these requirements.

Article 34 of the Chicago Convention (ICAO) specifically states: "There shall be maintained in respect of every aircraft engaged in international navigation a journey log book in which shall be entered particulars of the aircraft, its crew and of each journey, in such form as may be prescribed from time to time pursuant to this Convention".

FAA FSIM 8900.1 Vol 4, Chapter 12 section 4-1290 states regarding compliance with ICAO requirements: "When conducting oceanic flights, pilots of U.S.-registered aircraft must adhere to the U.S. regulations, ICAO Standards and Recommended Practices (SARP), and state regulations for the countries they overfly or where they land." FAR Section 91.703 specifically addresses ICAO Annex 2, which ensures that ICAO standards are regulatory to operators of U.S.-registered aircraft operating in oceanic airspace. The Convention on International Civil Aviation, commonly known as the Chicago Convention, is the basis for this requirement. Pilots should also review Annex 6, Part II, International General Aviation—Aeroplane The Scott International Procedures LLC, flight navigation tool containing the Scott Plot sm. Electronic Plotting Chart sm. is the only flight navigation tool in existence meeting these requirements. For each Flight for Record, the flight navigation tool collects information needed to comply with the Journey Logbook requirements. At the end of the flight the flight crew closes out the flight which triggers an automatic collation of documents used during the flight. The flight navigation tool automatically captures these documents with any annotations made on them and creates a single pdf document comprising these documents: Computerized Flight Plan; Track message; Itinerary; and Plotting Chart. The Journey Logbook PDF is then forwarded to the respective operator via email, or direct transfer to the operators Scott IPC portal account, while maintaining a copy on the local iPad used for the flight.

Figure 56:
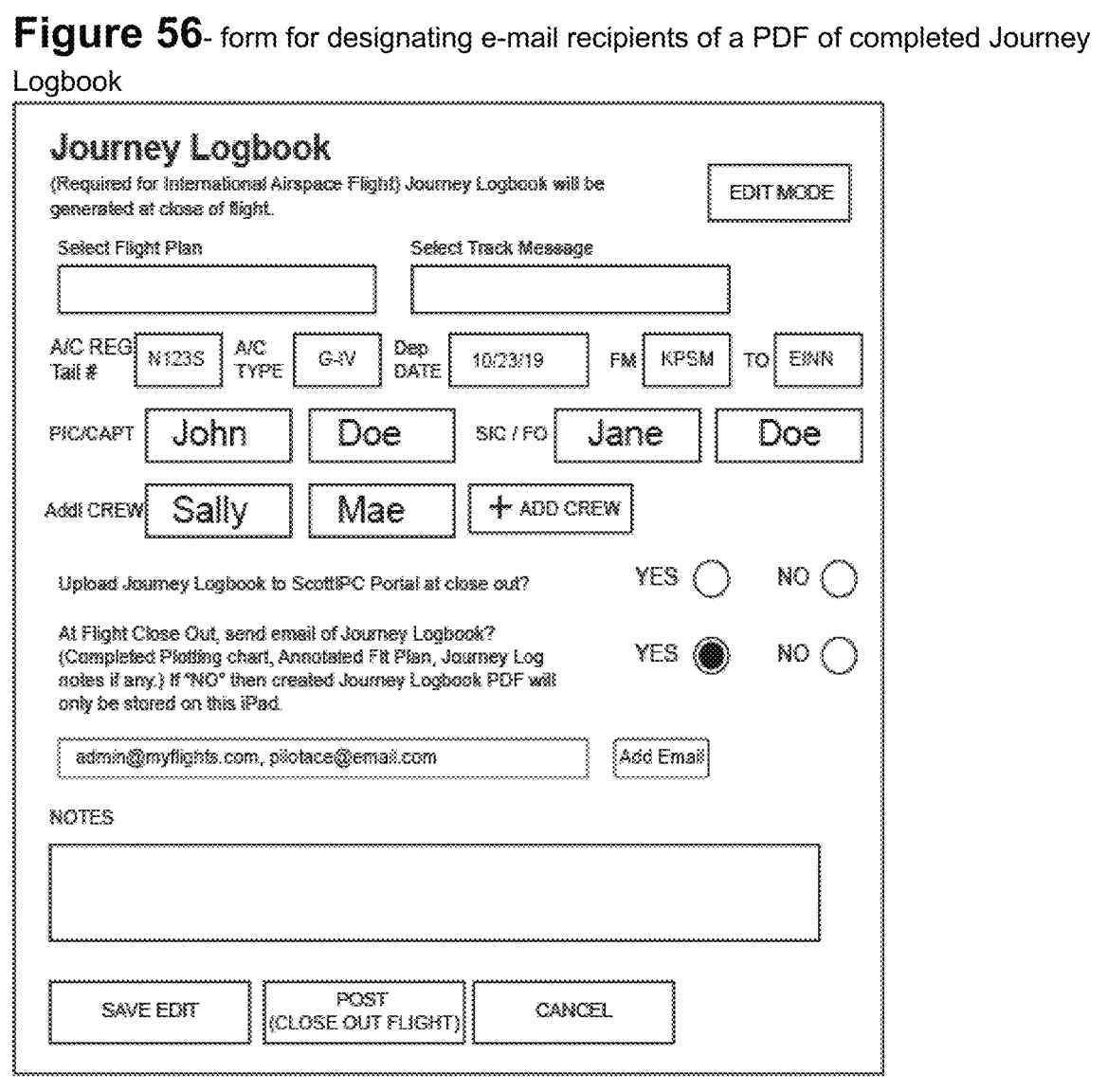

33. Automatically forwards closed out Journey Logbook to clients' portal based on clients' method desired "Unique to this tool"
   33.1 As shown in FIGS. 55 and 56, clients have control over how and where closed-out Journey Logbooks are sent and stored from within the Scott Plot sm. Electronic Plotting Chart flight navigation tool. The closed-out Journey Logbook can be stored only locally on the iPad, sent to the Scott IPC Portal via backend software, or emailed to any recipients the user would like to have a copy of the document.
34. Emails closed out journey logbook to desired recipients (FIG. 56) "Unique to this tool".
   34.1 As shown in FIG. 56, users can designate up to ten recipients that will receive a PDF copy of the completed Journey Logbook upon flight close-out.
35. Allows upload of PDF for use in flight navigation tool "Unique to this tool".
   35.1 The Scott IPC flight navigation tool allows for users to upload PDF documents via three different methods:
      35.1.1 Direct upload to flight navigation tool via email. User will tap this option on the menu, and email client will be opened. User can navigate to the desired email and select the PDF document attachment to be uploaded. Once user confirms document selection, the PDF is uploaded for use within the flight navigation tool.
      35.1.2 Direct upload from saved documents on iPad. User will tap this option on the flight navigation tool menu, and stored documents will be shown. User can select the PDF document to be uploaded. Once user confirms document selection, the PDF is uploaded for use within the flight navigation tool.
      35.1.3 Direct upload from Scott IPC Web Portal. User will tap this option on the flight navigation tool menu, another screen within the flight navigation tool is opened. User can select a desired PDF document from a list of documents stored in the user's account on the Portal. Once user confirms document selection, the PDF is uploaded for use within the flight navigation tool.

36. Integrates into ScottIPC International Cockpit Reference Handbook (ICRH) "Unique to this tool".
  36.1 The Scott Plot sm. Electronic Plotting Chart feature operates in conjunction with the Scott IPC International Cockpit Reference Handbook contained in the Scott IPC flight navigation tool. Users can transition between functions seamlessly. The menu system of the Scott IPC flight navigation tool allows for access to the Scott Plot sm. Electronic Plotting Chart or vice versa.
  36.2 The Scott Plot sm. Electronic Plotting Chart will also allow users to have direct access via links to standard procedures and/or contingency procedures during their flight. For example, when a user selects D.R. Tool, there is a tapeable box on the screen that will take the user to the proper section of the ICRH.
37. Provides User Profile Information
  37.1 Users have access to all information that is stored on their account, to include:
  Pilot Name
  Flight Department
  Scott IPC User ID number
  Pilot License number
  City of residence
  Title
  Aircraft Make & Model
  Country
  Phone number
  Email address
  37.2 Users are also able to change information on this page, including password, and can access GDPR Data Control information.
38. Provide user notification of changes to ICRH "Unique to this tool".
  38.1 The International Cockpit Reference Handbook (ICRH) is a document developed and updated according to FAA and ICAO standards. This document is frequently updated with important information and changes to FAA and ICAO procedure. To best serve our users, the Scott IPC flight navigation tool allows for custom, detailed notifications to be sent to users within the flight navigation tool when any updates are published within the flight navigation tool.
39. Allows Flight Department Administrators to assign permissions through the back end "Unique to this tool".
  39.1 Flight department administrators can use a specified number of "subscriptions" to assign permissions to their pilots, using the Scott IPC Web Portal. Permissions assigned on the web portal are recognized by email address (username) when a user signs in to the Scott IPC flight navigation tool.
40. Allows permissions to be assigned to individual aircraft "Unique to this tool".
  40.1 As some flight departments provide two permanently mounted iPads on each flight deck, Scott IPC developed a specific way to assign flight navigation tool credentials to a tail number, using individual email addresses for each iPad. This allows flight departments to operate with individual pilot iPads or company-owned and operated iPads.
41. Allows users to upload documents to their personal account on the backend and pulls those documents to the flight navigation tool. "Unique to this tool".
  41.1 Users can sign in to the Scott IPC Web Portal and upload documents. Any documents that are uploaded to the portal can be accessed by users with proper permissions from the Scott IPC flight navigation tool by tapping on "Flight Bag". See Section 35 for a description of how to access/use uploaded documents within the Scott IPC flight navigation tool.
42. Restricts access to sensitive documents as assigned by the user or flight department (FD) administrator. "Unique to this tool"
  42.1 To prevent any flight-related documents from being saved in the system for an individual pilot or flight department with sensitive documents, a control setting will allow for FD admin or pilot to enable or disable upload of various documents to the portal.
  42.2 When restriction is in use, this will meet requirements for sensitive and governmental accounts. It will prevent any saving of documents to the Scott IPC database, and all Journey Logbooks will only be saved on the local iPad on which they are created.
43. Allows user to build a specific plotting chart coverage based on route of flight and oceanic area flown. "Unique to this tool".
  43.1 User will be able to move the corners of the frame on the globe to encompass the area in which the user will need to plot a flight path. Once plotting chart is set, the user will see the area selected and be able to plot a flight path (see Setting The Plotting Chart below, section 52).
44. Automatically downloads relevant operational data and worldwide ARINC 424 database without pilot's intervention Upload process "Unique to this tool".
  44.1 The Scott IPC flight navigation tool and the Scott Plot sm. Electronic Plotting Chart feature automatically downloads the necessary data contained in the Scott IPC Portal to populate the International Cockpit Reference Handbook (ICRH) and the Plotting Chart data. Users need only to open the flight navigation tool within Wi-Fi coverage for the update to process. To aid in resisting man-in-the-middle attacks, the updates are downloaded from Scott IPC servers over an encrypted connection. To reduce the size of the flight navigation tool data, when a new database is available, only the data that has changed are uploaded into the flight navigation tool. Once the user sets a one-time data transfer preference then the user need not take further action for the updates. The valid period and version number of the database is always available to the user via a settings area.
  44.2 Notifications are sent to the users whenever operational information has changed with a description of the change. The Scott IPC backend Portal allows Scott IPC personnel to make a change to the material or guidance in the ICRH and upload to any Scott IPC device flight navigation tool. (Scott IPC can also send a notification to the users if important information needs to be passed to the operators, either individually or for all users. "Unique to this tool".)
45. Functions without the need for internet connection
  45.1 The Scott IPC flight navigation tool is designed for pilot use in a cockpit with no internet connectivity required. All information needed for the flight navigation tool configured as a "Portable Device Adapted to Assist Pilots in Compliance with International Flight Procedures and Navigation" is downloaded and stored within the device when the flight navigation tool is initially installed on the device. Upon connection to Wi-Fi, any functions (such as Track Message retrieval or ARINC 424 navigation Database or downloading of documents) that require updating with Wi-Fi will occur while the Scott IPC flight navigation tool is in use (logged in) and device is connected to the internet. After this transfer of data occurs, Wi-Fi is no longer required.

46. Allows pilot control of data usage of the flight navigation tool in flight due to the high cost of in-flight data from sat providers. "Unique to this tool"

46.1 Users have complete control within the flight navigation tool settings to turn off data usage. Forced data usage is a concern for pilots as inflight data is a significant cost. This on/off toggle setting is well-explained and provides users a way to ensure this flight navigation tool does not incur unexpected costs.

47. Indicates unique zoom levels and phased in graticule lines designed for plotting ease. Phased zoom levels and depictions of Graticule Lines. (FIGS. 57-66) "Unique to this tool"

47.1 The Scott Plot Plotting Chart has unique zoom settings that set the latitude and Longitude Graticule depiction schedule which will optimize the work area for the process or function executed. Different functions require a different level of accuracy. The flight navigation tool brings in the layers at the appropriate zoom level that would lend to ease of use for a specific task. There are four zoom levels with the Scott Plot feature that change the depiction of the graticule lines. Discussed below:

47.1.1 Zoom level one up to 80 degrees Latitude (FIG. 57). This is what is shown before and after setting the chart area of coverage. Up to 80 degrees North or South Latitude, the flight navigation tool depicts 10 degrees of Latitude and Longitude with solid lines. Each latitude and Longitude line will be labeled with the Hemisphere and 2 digits in degrees. Example 20° N. All Latitude labels at this zoom level are positioned directly on the line represented. The layout of the labels assists operators in mitigating errors in plotting. With western cultures script is read from left to right, that habit is sometimes erroneously applied to plotting western hemisphere Longitudes. In other words, the numbers get bigger reading right to left. To prevent this from happening:

47.1.1.2 For West Longitudes: The orientation of the number is facing so as to increase from right to left.

47.1.1.3 For East Longitudes: The orientation of the number is facing so as to increase from left to right.

47.1.2 Zoom Level 1: From 80 to 90 degrees Latitude (FIG. 58) because the Longitude Lines converge the closer you get to the poles there is a custom Graticule depiction scale use north of 80 degrees. Beyond 80 degrees of Latitude, the flight navigation tool will depict Longitude lines every 60 degrees of Longitude. The graticule lines therefore display at a density of lines per 60 degrees of longitude decreasing with latitude.

47.1.3 Zoom Level 2, up to 80 degrees Latitude. (FIG. 59). When zoom level 2 is attained the flight navigation tool displays labels every 10 degrees of Latitude and Longitude. It also displays whole degree tic marks on the right side of the longitude lines and above the latitude lines. 1-degree tic marks are shown between each 10-degree line. The Latitude labels are positioned directly on the line. The Longitude line labels for West Longitudes are positioned on the lines. For West Longitudes the numbers are orientated to increase from right to left. For East Longitudes, the label will be placed on the line, oriented and increasing from left to right. The 5-degree tic mark between each 10-degree latitude and longitude line extends beyond the center of the line for quick orientation.

47.1.4 Zoom level 2, From 80 degrees Latitude. (FIG. 60) When zoom level 2 is attained the flight navigation tool displays Longitude lines every 60 degrees. 1-degree Latitude tic marks are displayed on every Longitude line displayed up to 85 degrees latitude. The 85-degree tic mark extends across the longitude line. There are no tic marks between 85 and 90 degrees. The longitude lines converge at the poles. The graticule lines therefore display at a density of lines per 60 degrees of longitude decreasing with latitude.

47.1.5 Zoom level 3, up to 70 degrees Latitude. (FIG. 61) Up to 70 degrees Latitude, when zoom level 3 is attained the flight navigation tool displays Latitude and Longitude lines in 5-degree increments. Latitude and Longitude lines are labeled every 5 degrees. Solid ldegree tic marks are shown between each 5 degrees of Latitude and Longitude. Orientation of the tic marks are as previously defined in lessor zoom levels. They are positioned to the right of the Longitude line and on the top of the Latitude lines. The 1-degree tic marks are of the same length.

47.1.6 Zoom level 3, from 70 to 80 degrees Latitude. (FIG. 62) From 70 to 80 degrees Latitudes, when zoom level 3 is attained the flight navigation tool displays solid Latitude and Longitude lines in 10-degree increments. Solid 1 degree tic marks of equal size are on the Longitude lines. On the 75 and 80-degree Latitude line the 5-degree Longitude tic mark extends through the line of Latitude. Orientation of the tic marks are as previously defined in lessor zoom levels. They are positioned to the right of the Longitude line and on the top of the Latitude lines. The graticule lines therefore display at a density of lines per 60 degrees of longitude decreasing with latitude.

47.1.7 Zoom Level 3 from 80 to 90 degrees, same graticule depiction as 47.1.4.

47.1.8 Zoom Level 4 (FIG. 63). Up to 80 degrees latitude, when zoom level 4 is attained the flight navigation tool will depict every whole degree of Latitude and Longitude as a solid line. It will depict a tic mark every 10 minutes of Latitude and Longitude. The 30-minute tic mark will be longer and extend thru the Latitude and Longitude lines. Labels will be displayed for every 5-degree Latitude and Longitude. For Greater than 80 degrees latitude the depiction will be as the lessor zooms.

47.1.9 Zoom Level 5 (FIG. 64). When zoom Level 5 is attained up to 80 degrees latitude, every whole degree of Latitude and Longitude will be displayed as a solid line and labeled. Tic marks will be populated for every ten minutes of Latitude and Longitude. The 30-minute tic mark will be longer than the rest crossing over the line of longitude or latitude. Orientation of the tic marks will be the same as lessor zoom levels. Above 80 degrees depiction will be as lesson zooms.

47.1.10 Zoom level 6, Up to 80 degrees Latitude (FIG. 65). When Zoom level 6 is attained every whole degree of Latitude and Longitude will be displayed and labeled, depicted as a solid line. Tic marks will be shown in 5-minute increments with the 5-minute tic being the shortest and only on one side of the line. The 10-minute tic will be longer than the 5-minute tic mark and will cross over the Latitude or Longitude line. The 30-minute tic marks will be the longest and cross over the line of Latitude and Longitude. Greater than 80 degrees Latitude will be depicted the same as lessor zooms.

47.1.11 Zoom level 7, FIG. 66. Up to 80 degrees Latitude. When zoom level 7 is achieved, every whole degree of Latitude and Longitude will be depicted as a solid line and labeled. 1-minute tic marks will be depicted along every whole degree of Latitude and Longitude line. Every ten-minute tick mark will be depicted and be longer than the one-minute tic marks and the will cross over the line of Latitude and Longitude. A 30-minute tic mark will be depicted and be longer than the ten-minute tic mark. Greater than 80 degrees latitude will depicted various tic marks depending on tilt.

47.2 Zoom Scale depiction. "Unique to this tool". The Plotting chart displays a custom scale that identifies the zoom map height and level. This allows developers and users to specify the exact zoom level if an issue arises and information needs to be passed to Scott IPC operations regarding depictions.

48. PP DIR TO (Present Position Direct To):

48.1 A user can select TOOLBOX→CONTINGENCY PP DIR TO and is presented with the PP DIR TO entry box. (FIG. 67) When a user selects the PP function, they are presented with a data entry page that allows them to enter a destination for a rapid divert. With GPS functioning, the aircraft position is automatically inserted into the present position from box and the user need only enter a destination location either by Latitude longitude or by a name. "Unique to this tool".

48.2 When a user selects the PP DIR TO function, the aircraft present position is populated in the PP/FROM field. (If GPS is active).

48.3 A user can enter a full LAT/LONG or a named waypoint in the PP/FROM fields.

48.4 A user can enter a full LAT/LONG or a named waypoint in the DIR To fields.

48.5 If a user enters a named waypoint, its Lat/Long is automatically shown in the Lat/Long boxes.

48.6 The user can overwrite the posted Present Position by selecting the box and entering different values.

48.7 The named waypoint fields can accept 2, 3 or 5 letter entries which will pull from the ARINC 424 database.

48.8 A user with GPS active, after building the PP DIR TO route can then post the route to the plotting chart. And immediately begin to fly the route. The user can display the full leg details if it is a D.R. situation.

48.9 The leg has a hollow circle centered at each end that may be dragged and dropped to a new location if desired.

48.10 The route posted is a Great Circle Route.

49 Has blue light filter to preserve night vision in the cockpit 49.1 The Scott IPC flight navigation tool allows users to enable a "blue light filter," called "Night Mode" in the settings menu. This feature assists in optimizing and maintaining night vision acuity and allows pilots to decide what level of blue light filter is applied. Using a slider tool, adjusting the levels of blue light filter dims blue pixels in the tablet computer display.

50 Separate brightness feature 50.1 In the same settings menu, users can determine the brightness of the screen with a separate slider tool, whether night mode is engaged or not.

51. In-flight navigation tool rotate screen lock to accommodate aircraft maneuvering 51.1 Users can lock the screen orientation within the flight navigation tool settings so that the screen locks to a preferred rotation within the flight navigation tool. This does not affect the screen lock outside of the flight navigation tool. Aircraft anticipated or actual maneuvering requires this feature be easily and quickly accessible.

52. Setting and Adjusting the Plotting Chart Coverage Area. "Unique to this tool".

52.1 Before the user can use the Plotting Chart Feature, the user must first set the chart area that will contain the route. The user can set the Plotting chart area before or after building the route. The Scott Plot app allows the user to frame the exact area that will be needed for the Plotting Chart. When the Plotting Chart feature is first selected, the user is presented with a globe and is also presented with a frame that overlays the globe (FIG. 68). The user rotates and zooms the globe while adjusting the frame edges to ensure the area is covered that will be used for the flight. The frame can also be adjusted with rotation and zoom. Once the user is satisfied with the coverage area then the user selects SET CHART. A message then appears asking the user to verify that the Coast Out and Coast In areas are covered and that they are happy with the selection of the coverage area. If the user is satisfied, then he selects "Continue". If the user needs to adjust the coverage area again he can select Edit and set the chart coverage area again.

52.2 Once the Plotting chart is set, the frame depicting the coverage area is always depicted. This allows for rapid location of the route on the globe. At the end of the flight the user closes out the flight, wherein the flight navigation tool creates a PDF file of any route, annotations, ETP's or notes placed in the frame area during the flight made by the operator. This coverage area, along with the computerized flight plan, track message and Journey Logbook entry items and any items above are all merged to form a single PDF to comply with ICAO and FAA requirements to capture and maintain a Journey Logbook of the flight. This is known as a Completed Journey logbook. No other personal electronic device or flight navigation tool has this capability.

52.3 There is no other fully electronic Plotting Chart tool with the full capabilities discussed in this document on the market today. This unique tool allows for a Plotting Chart to be created for any airspace in the world, regardless of the route of flight. The Scott Plot tool also allows for Polar Operational Plotting as well. Polar operational plotting has always been a problem with paper plotting charts, mostly due to the Mercator Projections used for that region of the globe. The Scott Plot tool allows for a complete area of coverage to be adjusted for the polar crossing scenarios with no distortion of rendering due to projection models.

53. NAT RADAR & ADS-B Surveillance Corridor for multiple altitudes "Unique to this tool".

53.1 The Scott Plot flight navigation tool features a display of the North Atlantic ADS-B (Automatic Dependent Surveillance-Broadcast) ground coverage area for three different altitudes. Flight Level 200, Flight Level 300, and Flight Level 400. The coverage area allows operators to anticipate direct surveillance by ATC and may be used for contingency planning.

53.2 The flight navigation tool also allows a user to identify ground radar coverage areas with ease. This is provided to allow an operator to anticipate when the aircraft will be under direct radar or ADS-B surveillance for contingency purposes.

54. Plotting Chart Setup Wizard 54.1 The Scott Plot sm. Electronic Plotting Chart also features a setup wizard that will walk pilots through necessary steps of setting up a Flight for Record. It is presented in an interactive checklist format. The user will be taken through a series of screens that provide prompts to complete tasks for setup (FIG. 69).

54.1.1 User will first be presented a screen that will display status of data updates and allow for the most recent information to be uploaded (FIG. 70).

54.1.2 The next screen will ask user to choose whether to sync devices. If user chooses to sync, the setup wizard will take user through sync steps and move to the next screen. If the user chooses not to sync now, the user will be advised that they may sync at any time and will be taken to the next screen. (FIG. 71).

54.1.3 The next screen will prompt the user to upload any needed documents for the execution of the flight. User will be able to upload a new document from email or from the Scott IPC app. Any available documents that have been uploaded to the Scott IPC Portal will be listed as options to upload. (FIG. 72).

54.1.4 The next screen asks the user if this is a flight for record. If user taps 'YES', the Journey Logbook form is presented and user will fill out required information for the aircraft, crew, and where the Journey Logbook will be sent upon closeout of the flight or if it will be saved locally on the iPad. (FIG. 73).

54.1.5 Next, the user will be prompted to choose an oceanic Checklist to use for the flight. User will have the option to use a default checklist, edit the default, or create a new checklist. Once an option is chosen, user is either walked through edit screens then returned to the wizard or with no edits returned to the wizard (FIG. 74).

54.1.6 Another option under the wizard is to set the plotting chart area frame. User will be taken to the plotting chart globe to choose area where route will be drawn. User will set the area by rotating frame and moving corners to encompass area of anticipated route and alternates. After user sets plotting chart area frame, user will tap 'Set Frame' and 'Continue' to return to the plotting chart setup wizard (FIG. 75).

54.1.7 User will then set route by tapping 'Go to Build Route'. User may enter full lat/long coordinates or can enter named waypoints. Once all waypoints are entered, user will tap 'Post Route', view route on chart, and tap 'Continue' to return to the wizard (FIG. 76).

54.1.8 User will then set ETPs. see (sec 12 Automatically or Manually build ETP's) After ETPs are set, the ETP layer is automatically set to "on", and the user views ETPs on Plotting Chart screen, taps 'CONTINUE' and user moves to next screen within the wizard. (FIG. 77).

54.1.9 User is then able to toggle on/off Oceanic Flight Reminders that will come up at designated times during flight to assist user in completing necessary tasks at the appropriate time (FIG. 78).

54.1.10 The user will then tap 'Finish' and be taken to the plotting chart that is now set for a flight to begin.

55. Toolbox Item Menus. "Unique to this tool"

55.1 The tool box for this flight navigation tool contains sections presented in the same order that the need would arise during an actual oceanic crossing. This menu system order presentation is "Unique to this tool".

55.1.1 Flight Planning, Preflight Checklist, Off Blocks prior to Takeoff Checklist, Enroute, In-Flight Tools, Contingencies and Training.

55.2 Flight Planning contains:
  55.2.1 Checklist
  55.2.2 Flight Support documents
    55.2.2.1 Flight Plan
      55.2.2.1.1 Import from email
      55.2.2.1.2 Import from iPAD
      55.2.2.1.3 Import from Scott IPC
      55.2.2.1.4 Manage Imported Flight Plans
    55.2.2.2 Journey Logbook
      55.2.2.2.1 Create
      55.2.2.2.2 View Active
      55.2.2.2.3 View Archived
    55.2.2.3 Manuals and Documents
      55.2.2.3.1 Import from email
      55.2.2.3.2 Import from iPAD
      55.2.2.3.3 Import from Scott IPC
      55.2.2.3.4 Manage Docs
  55.2.3 Build/Modify Routes
    55.2.3.1 Auto Plot Legs
    55.2.3.2 Modify Route drag and Drop
  55.2.4 ETP's
55.3 Preflight Checklist
55.4 Off Blocks prior to Takeoff Checklist
55.5 Enroute
  55.5.1 Prior to Coast Out
    55.5.1.1 Checklist
    55.5.1.2 Build Modify Routes
      55.5.1.2.1 Auto Plot Legs
      55.5.1.2.2 PP Dir TO
      55.5.1.2.3 Modify Route Drag and Drop
    55.5.1.3 Build Modify ETP's
    55.5.1.4 Nav System Accuracy Check
  55.5.2 Approaching Waypoint Checklist
  55.5.3 Passing each Waypoint
    55.5.3.1 Checklist
    55.5.3.2 Position report Form
55.6 In-Flight Tools
  55.6.1 10 Min Check
  55.6.2 ETP's
  55.6.3 Plot position
  55.6.4 Distance tool
  55.6.5 Wind Correction Stamp
  55.6.6 Speed Dis Time Calc
  55.6.7 Full Route Details
55.7 Contingencies & PP DIR TO
55.8 Training
  55.8.1 Freeplay Mode

CONCLUSION

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A flight navigation tool for use in aircraft cockpits comprising:
   a tablet computer having memory system incorporating nonvolatile memory;
   the nonvolatile memory having recorded therein a flight navigation routine, an aviation database comprising international operating rules comprising transoceanic flight rules, and machine readable code configured to display portions of the international operating rules upon demand;
   a moving-map database configured with tracks, coastal airport identifiers and locations, predefined routes, and predefined reporting point locations for transoceanic operations;
   machine readable code configured to read a current location from a GPS receiver, and to indicate the current location on a moving map display representing a portion of the moving-map database;
   a trip database, and machine readable code configured to interface with a user with a touchscreen and to use a method selected from the group consisting of direct entry of waypoint coordinates or names and selection of predefined tracks to configure the trip database with a planned transoceanic route for an individual flight;
   a checklist database and machine readable code for comparing the current location with popup display locations at which checklists from the checklist database are automatically displayed on the moving map display;
   wherein the checklist database is user configurable and comprises checklists for at least a pre-departure flight phase, a coast-out flight phase, a waypoint-reached flight phase, and a coast-in flight phase; and
   wherein the machine readable code for displaying the moving map display comprises code for displaying graticule lines at a density of 60 lines per degree of longitude that decreases with increasing latitude.

2. The flight navigation tool of claim 1 further comprising machine readable code adapted to provide pilots with a heading and next-waypoint timing for a rhumb-line route from a location where the GPS fails to the next waypoint of the currently active route.

3. The flight navigation tool of claim 1 wherein the moving map database further comprises:
   international airport frequencies;
   radio navigational aid (NAVAID) locations, frequencies, and identifiers; and
   boundary information for restricted, alert, and warning areas.

4. A flight navigation tool for use in aircraft cockpits comprising:
   a tablet computer having a GPS receiver and a memory system incorporating nonvolatile memory;
   the nonvolatile memory having recorded therein a flight navigation routine, an aviation database comprising international operating rules comprising transoceanic flight rules, and machine readable code configured to display portions of the international operating rules upon demand;
   a moving-map database configured with tracks, coastal airport identifiers and locations, predefined routes, and predefined reporting point locations for transoceanic operations;
   machine readable code configured to read a current location from the GPS receiver, and to indicate the current location on a moving map display representing a portion of the moving-map database;
   a trip database, and machine readable code configured to interface with a user with a touchscreen and to use a method selected from the group consisting of direct entry of waypoint coordinates or names and selection of predefined tracks to configure the trip database with a planned transoceanic route for an individual flight;
   a checklist database and machine readable code for comparing the current location with popup display locations at which checklists from the checklist database are automatically displayed on the moving map display;
   wherein the machine readable code for displaying the moving map display comprises code for displaying graticule lines at a density of 60 lines per degree of longitude that decreases with increasing latitude.

5. The flight navigation tool of claim 4 further comprising machine readable code adapted to provide pilots with a heading and next-waypoint timing for a rhumb-line route from a location where the GPS fails to the next waypoint of a currently active route.

6. The flight navigation tool of claim 5 configured to automatically update its databases by downloading over an encrypted connection.

7. The flight navigation of claim 4 wherein the checklist database is user configurable.

8. The flight navigation tool of claim 4 wherein the moving map database further comprises:
   international airport frequencies;
   radio navigational aid (NAVAID) locations, frequencies, and identifiers; and
   boundary information for restricted, alert, and warning areas.

9. A flight navigation tool for use in aircraft cockpits comprising:
   a tablet computer having a GPS receiver and a memory system incorporating nonvolatile memory;
   the nonvolatile memory having recorded therein a flight navigation routine, an aviation database comprising international operating rules comprising transoceanic flight rules, and machine readable code configured to display portions of the international operating rules upon demand;
   a moving-map database configured with tracks, coastal airport identifiers and locations, predefined routes, and predefined reporting point locations for transoceanic operations;
   machine readable code configured to read a current location from the GPS receiver, and to indicate the current location on a moving map display representing a portion of the moving-map database; and
   a trip database, and machine readable code configured to interface with a user with a touchscreen and to use a method selected from the group consisting of direct entry of waypoint coordinates or names and selection of predefined tracks to configure the trip database with a planned transoceanic route for an individual flight;
   the flight navigation tool further configured to link to a second flight navigation tool over a short-range radio as a flight navigation tool pair, the flight navigation tool further comprising machine readable code configured to identify a flight navigation tool of the pair as a master flight navigation tool and the other flight navigation tool of the pair as a secondary flight navigation tool, to synchronize the flight navigation tools of the pair by transmitting updates from a trip database of the secondary flight navigation tool to the master flight navigation tool and update the trip database of the secondary flight navigation tool from the trip database of the master flight navigation tool, and to send a heartbeat message repeatedly from the master primary flight navigation tool to the secondary flight navigation tool.

10. A method of assisting pilots performing overwater flight operations comprising:
providing a portable navigation tool having a GPS receiver and a memory system, the memory system having recorded therein a moving-map database configured with tracks, coastal airport identifiers and locations, and predefined routes and predefined reporting point locations for transoceanic operations, with machine readable code configured to read a current location from the GPS receiver, and to indicate the current location on a moving map display representing a portion of the moving-map database;
the memory system further containing a trip database;
interfacing with a user with a touchscreen with a method selected from the group consisting of direct entry of waypoint coordinates or names and selection of predefined tracks to configure the trip database with a planned transoceanic route for an individual flight;
reading a current location from the GPS receiver, and indicating the current location on a moving map display representing a portion of the moving-map database;
comparing the current location with checklist display locations and displaying checklists from a checklist database upon reaching checklist display locations; and
displaying the moving map display with graticule lines at a density of 60 lines per degree of longitude that decreases at high latitudes.

11. The method of claim 10 wherein the checklist database is user configurable.

12. The method of claim 11 wherein the checklist database comprises checklists for at least a pre-departure flight phase, a coast-out flight phase, a prior to waypoint-flight phase, a waypoint-reached flight phase, and a coast-in flight phase.

13. The flight navigation tool of claim 10 wherein the moving map database further comprises:
international airport frequencies;
radio navigational aid (NAVAID) locations, frequencies, and identifiers; and
boundary information for restricted, alert, and warning areas.

14. A method of assisting pilots performing overwater flight operations comprising:
providing a portable navigation tool having a GPS receiver and a memory system, the memory system having recorded therein a moving-map database configured with tracks, coastal airport identifiers and locations, and predefined routes and predefined reporting point locations for transoceanic operations, with machine readable code configured to read a current location from the GPS receiver, and to indicate the current location on a moving map display representing a portion of the moving-map database;
the memory system further containing a trip database;
interfacing with a user with a touchscreen with a method selected from the group consisting of direct entry of waypoint coordinates or names and selection of predefined tracks to configure the trip database with a planned transoceanic route for an individual flight;
reading a current location from the GPS receiver, and indicating the current location on a moving map display representing a portion of the moving-map database;
comparing the current location with checklist display locations and displaying checklists from a checklist database upon reaching checklist display locations; and
providing pilots with a heading and next-waypoint timing for a rhumb-line route from a location where the GPS fails to the next waypoint of a currently active route.

15. The method of claim 14 wherein the checklist database is user configurable.

16. The flight navigation tool of claim 14 wherein the moving map database further comprises:
international airport frequencies;
radio navigational aid (NAVAID) locations, frequencies, and identifiers; and
boundary information for restricted, alert, and warning areas.

* * * * *